(12) United States Patent
Kelly et al.

(10) Patent No.: US 10,937,275 B2
(45) Date of Patent: *Mar. 2, 2021

(54) LIVE ACTION VIDEO GAMES

(71) Applicant: Fusion Holdings Limited, Douglas (IM)

(72) Inventors: Ross Kelly, La Lucia (ZA); Artur Piel, Tallin (EE)

(73) Assignee: Fusion Holdings Limited, Douglas (IM)

( * ) Notice: Subject to any disclaimer, the term of this patent is extended or adjusted under 35 U.S.C. 154(b) by 0 days.

This patent is subject to a terminal disclaimer.

(21) Appl. No.: 16/917,200

(22) Filed: Jun. 30, 2020

(65) Prior Publication Data
US 2020/0334956 A1    Oct. 22, 2020

Related U.S. Application Data

(63) Continuation of application No. 16/848,390, filed on Apr. 14, 2020, which is a continuation of application (Continued)

(30) Foreign Application Priority Data
Jan. 27, 2017    (GB) .................................. 1701410

(51) Int. Cl.
G07F 17/32    (2006.01)
G06F 16/438    (2019.01)

(52) U.S. Cl.
CPC ........ G07F 17/3262 (2013.01); G06F 16/438 (2019.01); G07F 17/3211 (2013.01); G07F 17/3293 (2013.01)

(58) Field of Classification Search
USPC ...................................................... 463/16, 17
See application file for complete search history.

(56) References Cited

U.S. PATENT DOCUMENTS 5,775,993 A    7/1998 Rentz et al.
6,293,866 B1    9/2001 Walker
(Continued)

FOREIGN PATENT DOCUMENTS

GB    2450584 A    12/2008

OTHER PUBLICATIONS

IP Australia, Examination Report No. 1 for Australian Pat. App. No. 2018200365, dated Oct. 8, 2018.
(Continued)

*Primary Examiner* — Pierre Elisca
(74) *Attorney, Agent, or Firm* — McDonnell Boehnen Hulbert & Berghoff LLP

(57) ABSTRACT

Methods and apparatus are disclosed related to simulated live dealer games. A computing device can receive a request to play a game of chance that includes a plurality of game actions ordered by a game sequence. The computing device can play the game of chance by: determining a particular game action based on the game sequence; determining a plurality of pre-recorded video segments related to the particular game action, where each of the pre-recorded video segments records a respective instance of the particular game action being performed by a person; selecting a particular pre-recorded video segment from the plurality of pre-recorded video segments; and generating a display related to the particular game action that includes at least a portion of the particular pre-recorded video segment.

20 Claims, 13 Drawing Sheets

Related U.S. Application Data

No. 15/870,851, filed on Jan. 12, 2018, now Pat. No. 10,657,771.

(56) References Cited

U.S. PATENT DOCUMENTS

| | | | |
|---|---|---|---|
| 8,272,958 B2 | 9/2012 | Smith et al. | |
| 8,425,313 B2 * | 4/2013 | Nelson | G06Q 30/02 463/29 |
| 2006/0003830 A1 | 1/2006 | Walker | |
| 2006/0217199 A1 * | 9/2006 | Adcox | G07F 17/3223 463/40 |
| 2007/0117623 A1 * | 5/2007 | Nelson | G06Q 50/34 463/29 |
| 2008/0214262 A1 | 9/2008 | Phillips | |
| 2011/0183746 A1 | 7/2011 | Englman | |
| 2014/0370958 A1 * | 12/2014 | Lutnick | G07F 17/32 463/17 |

OTHER PUBLICATIONS

IP Australia, Examination Report No. 2 for Australian Pat. App. No. 2018200365, dated Feb. 15, 2019.

Canadian Patent Office, Examination Report for Canadian Patent Application No. 2992214, dated Dec. 13, 2018.

* cited by examiner

LIVE ACTION VIDEO GAMES

CROSS-REFERENCE TO RELATED APPLICATIONS

This application claims priority under 35 U.S.C. § 120 to, and is a continuation of, U.S. non-provisional patent application Ser. No. 16/848,390, filed on Apr. 14, 2020, and entitled "Live Action Video Games," which is incorporated herein by reference in its entirety for all purposes.

U.S. non-provisional patent application Ser. No. 16/848,390 claims priority under 35 U.S.C. § 120 to, and is a continuation of, U.S. non-provisional patent application Ser. No. 15/870,851, filed on Jan. 12, 2018, entitled "Live Action Video Games," and issued as U.S. Pat. No. 10,657,771 on May 19, 2020, which is incorporated herein by reference in its entirety for all purposes.

U.S. non-provisional patent application Ser. No. 15/870,851 claims priority under 35 U.S.C. § 119 to United Kingdom Patent Application No. 1701410.1 filed on Jan. 27, 2017. United Kingdom Patent Application No. 1701410.1 is hereby incorporated by reference in its entirety for all purposes.

BACKGROUND

In the gaming art, the term "Live Dealer" refers to games in which a player participates in a live table game from a location remote from an area of live play such as, for example, from a casino or a film studio. A live table game is one that is conducted by a real person such as a dealer with respect to card games, or a croupier with respect to other table games.

Live Dealer games may be available for a variety of different live casino table games such as, for example, roulette, baccarat and blackjack. A Live Dealer game may include both remote players and local players present at the area of live play or may, alternatively, only involve remote players A remote player participating in a Live Dealer game may receive a video stream of a live dealer, such as a roulette croupier or a blackjack dealer, conducting a live table game at the area of live play. The video stream enables the remote player to observe the game play and to receive the results of such game play, such as the outcomes of spins of a roulette wheel or the cards dealt in a card game. The remote payer may also be presented with a user interface that enables the player to participate in the game by placing wagers on outcomes of the game and by exercising any game play decisions that may be required.

The provision of Live Dealer games is expensive. For example, a studio from which live games are conducted requires the provision of physical gaming tables, real dealers and/or croupiers and supervisory staff (e.g. pit bosses) to oversee the dealers and the croupiers in order to ensure fair play and to minimise any possibility of collusion. Furthermore, the provision of a video stream of live play from the studio requires lighting and camera equipment as well as adequate transmission bandwidth.

The present disclosure relates to a method of implementing an equivalent of such a Live Dealer game that does not rely on a live video feed of a real dealer/croupier, but nevertheless still provides a remote player with an illusion of live interaction with a real dealer.

OVERVIEW

Example embodiments are described herein. In a first respect, an example embodiment takes the form of a method including: (I) receiving, at a computing device, a request to play a game of chance that includes a plurality of game actions ordered by a game sequence; and (II) using the computing device to play the game of chance by at least: (a) determining a particular game action of the plurality of game actions based on the game sequence; (b) determining a plurality of pre-recorded video segments related to the particular game action, where each of the plurality of pre-recorded video segments records a respective instance of the particular game action being performed by a person; (c) selecting a particular pre-recorded video segment from the plurality of pre-recorded video segments; and (d) generating a display related to the particular game action that includes at least a portion of the particular pre-recorded video segment.

In a second respect, an example embodiment takes the form of a computing device that includes: (I) means for receiving a request to play a game of chance that includes a plurality of game actions ordered by a game sequence; and (II) means for playing the game of chance that include: (a) means for determining a particular game action of the plurality of game actions based on the game sequence; (b) means for determining a plurality of pre-recorded video segments related to the particular game action, where each of the plurality of pre-recorded video segments records a respective instance of the particular game action being performed by a person; (c) means for selecting a particular pre-recorded video segment from the plurality of pre-recorded video segments; and (d) means for generating a display related to the particular game action that includes at least a portion of the particular pre-recorded video segment.

In a third respect, an example embodiment takes the form of a computer-readable medium configured to store instructions that, when executed by one or more processors of a computing device, cause the computing device to carry out functions including: (I) receiving a request to play a game of chance that includes a plurality of game actions ordered by a game sequence; and (II) playing the game of chance by at least: (a) determining a particular game action of the plurality of game actions based on the game sequence; (b) determining a plurality of pre-recorded video segments related to the particular game action, where each of the plurality of pre-recorded video segments records a respective instance of the particular game action being performed by a person; (c) selecting a particular pre-recorded video segment from the plurality of pre-recorded video segments; and (d) generating a display related to the particular game action that includes at least a portion of the particular pre-recorded video segment.

In a fourth respect, an example embodiment takes the form of a computing device that includes: (I) one or more processors; and (II) data storage configured to store at least computer-readable program instructions that, when executed by the one or more processors, cause the computing device to carry out functions including: (a) receiving, at a computing device, a request to play a game of chance that includes a plurality of game actions ordered by a game sequence; and (b) using the computing device to play the game of chance by at least: (i) determining a particular game action of the plurality of game actions based on the game sequence; (ii) determining a plurality of pre-recorded video segments related to the particular game action, where each of the plurality of pre-recorded video segments records a respective instance of the particular game action being performed by a person; (iii) selecting a particular pre-recorded video segment from the plurality of pre-recorded video segments;

and (iv) generating a display related to the particular game action that includes at least a portion of the particular pre-recorded video segment.

BRIEF DESCRIPTION OF THE DRAWINGS

Example embodiments are described herein with reference to the drawings, in which.

DETAILED DESCRIPTION

I. Introduction

Figure 1:
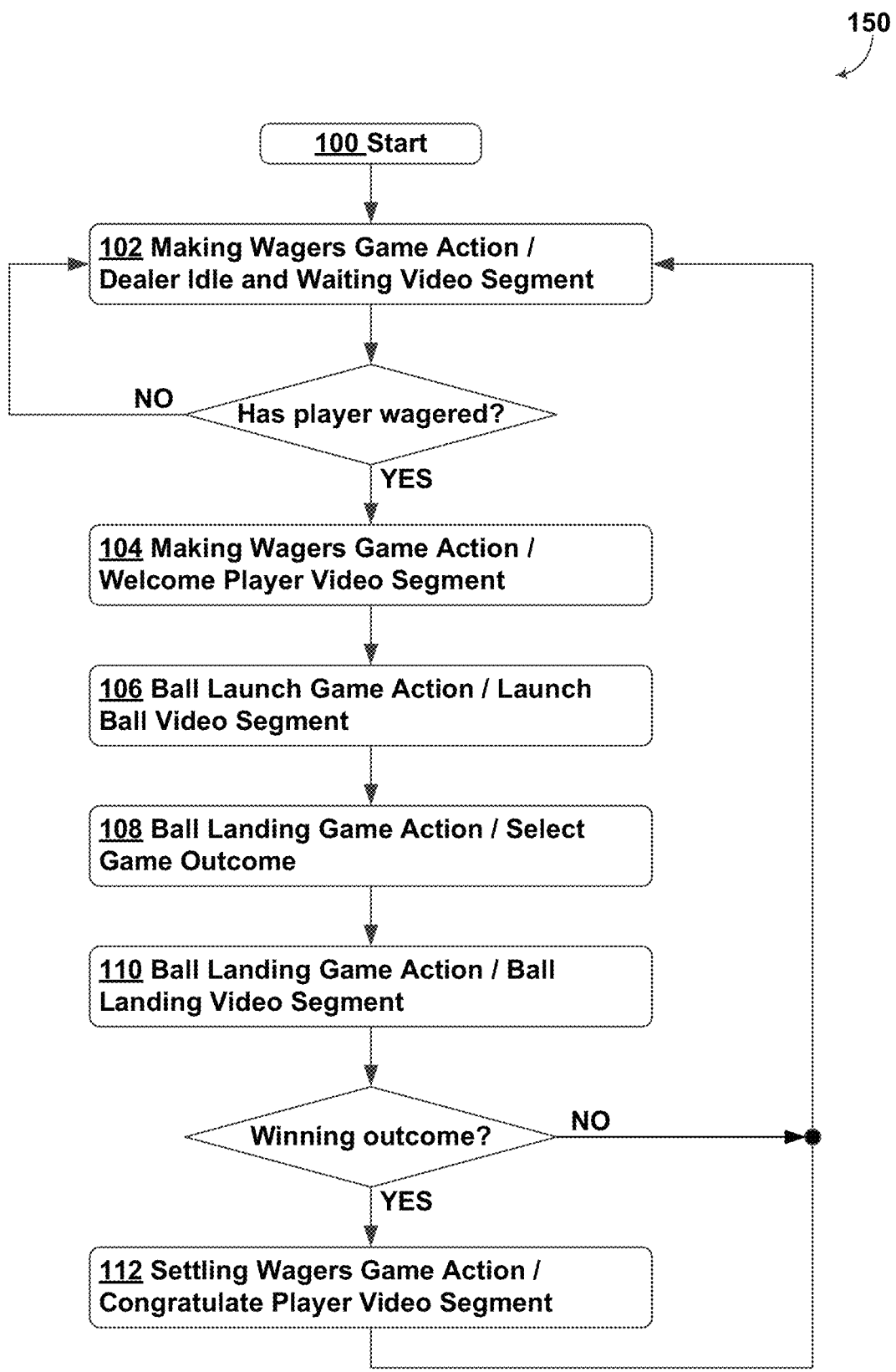
FIG. 1 is a flow chart illustrating a set of functions related to the game of roulette, in accordance with an example embodiment.

Herein are disclosed techniques for "stitching together" pre-recorded video segments related to games of chance to provide an arbitrarily large number of possible game play sequences. Each game play sequence can be divided into game actions, such as waiting for a wager, spinning a roulette ball, and announcing the result of a game, and each game action can be associated with one or more video segments. A video segment can be one or more files and/or or other storage units for storing video data, and perhaps related audio data. As an example, pre-recorded video segments can record instances of a game action, such as segments of a live game play sequence, being performed by a person (e.g., a dealer, a croupier). To provide a display of a game of chance being played, a software application can select and display an associated pre-recorded video segment for each game action of a game play sequence for the game of chance.

Many games of chance can be classified as either single-state or multi-state games. In a single-state game, such as roulette, a player places one or more wagers on an outcome of the game, whereupon the croupier may spin the roulette wheel to determine the outcome of the game and thereafter to resolve the player wagers. In a multi-state game such as blackjack the player makes game play decisions at various stages during the course of the game; for example, whether to stand, hit, split, or to surrender during a turn of the blackjack game.

Some games of chance can be divided into a plurality of game actions ordered by a game sequence. For example, the game of roulette can be considered to have the following four roulette game actions: a making wagers game action, a ball launch game action, a ball landing game action, and a settling wagers game action. In this example, a roulette game sequence can be: (1) the making wagers game action takes place where a dealer can accept one or more wagers from one or more players on an outcome of a ball landing in a roulette wheel, (2) the ball launch game action where the roulette wheel is spun and the ball launched into the spinning roulette wheel, (3) the ball landing game action, where the ball launched in the ball launch segment eventually lands into a slot of the roulette wheel to determine an outcome of the game of roulette, and (4) the settling wagers game action, where wagers made during the making wagers segment are either paid off or collected by the house depending on the outcome of the game of roulette determined at the end of the ball landing segment. Similar divisions of other games of chance into respective game actions ordered by respective game sequences are possible as well, including, but not limited to, the games of blackjack, baccarat, poker, boule, craps, chuck-a-luck, Fan Tan, wheel of fortune, and keno.

Continuing with the roulette example, the following set of pre-recorded roulette video segments can be used in order to simulate a live video stream of the game:

(a) a "dealer idle and waiting" video segment;
  (b) a "dealer welcomes player" video segment;
  (c) a "dealer launches ball" video segment;
  (d) a set of pre-recorded video segments of the ball landing in each position on the roulette wheel (i.e. 37 video segments for European roulette and 38 video segments for American roulette); and
  (e) a "dealer congratulates player" video segment.

In other examples, more, fewer, and/or different roulette video segments can be associated with the game of roulette.

The above-mentioned roulette video segments can be associated with the above-mentioned roulette game actions; e.g., the making wagers segment can be associated with the "dealer idle and waiting" and "dealer welcomes player" video segments, the ball launch segment can be associated with the "dealer launches ball" video segment, the ball landing segment can be associated with the set of pre-recorded video segments of the ball landing, and the settling wagers segment can be associated with the "dealer congratulates player" video segment. Then, a software application simulating a live video stream of the game of roulette can use the roulette game sequence to sequence through the above-mentioned roulette game actions while the displaying the above-mentioned roulette video segment(s) associated with each roulette game action in its turn.

In some examples, multiple versions of a video segment can be recorded. For example, a first version of the "dealer idle and waiting" video segment can involve a waiting time of ten seconds, a second version of the "dealer idle and waiting" video segment can last fifteen seconds, and so on. As another example, one version of the video segment can capture a first dealer, and another version of the video segment can capture a second dealer who differs from the first dealer. Still another example can involve different video segment versions of a dealer (or other person) speaking in different languages; e.g., English, Mandarin, Cantonese, French, etc. Many other examples of different video segments and different versions of video segments are possible.

The software application can execute on one computing device and communicate with another computing device, such as a gaming server, to play the game of chance. For example, the gaming server can provide gaming results and perform account management services during game play, such as taking wagers, paying winnings, etc. In some cases, the software application can obtain the video segments as part of an installation package; i.e., the application is bundled with the video segments. In other cases, the gaming server (or another computing device) can transmit one or more video segments to a computing device executing the software application. In some of these cases, a transmitted video segment can be stored in data storage, such as a cache and/or main memory, of the computing device and later replayed from data storage rather than being retransmitted.

The software application can provide a user interface to conduct the game of chance. For example, the user interface can take wagers, display video segments associated with gaming sequences, and display results. In some cases, the user interface can generate a user display that includes video segments, still images, and/or graphical objects, such as a 3D graphical object representing a card, or slot of roulette wheel. In particular examples, the 3D graphical object can represent at least a portion of a video segment, such as a portion of a video segment showing a dealer conducting the game of chance. The user interface can then compose a display from the 3D graphical object representing the dealer, other graphical objects, such as one or more still images of a casino backdrop, and perhaps additional 3D graphical objects, such as 3D graphical objects representing cards.

II. Example Live Action Video Games

FIG. 1 is a flow chart depicting a set of functions 150 that can be carried out in accordance with an example embodiment. For example, a software application can be executed on a computing device, such as computing device 400 described below, to carry out some or all the set of functions 150. The set of functions 150 can be performed to carry out a turn of a single-state game of roulette. The set of functions are shown within blocks 100 through 112. A description of those blocks now follows.

At block 100 the player can launch a roulette game; e.g., start and/or instruct the above-mentioned software application to play the roulette game. For example, the player can provide a request via a user interface to the software application to play the roulette game.

At block 102, the software application for the roulette game can begin the making wagers game action by displaying the pre-recorded "dealer idle and waiting" video segment to the player (i.e. segment (a) above). The "dealer idle and waiting" video segment can be displayed until the player has placed one or more wagers on an outcome of the turn of the roulette game.

Next, at block 104, once the player has completed wagering, the software application can display the pre-recorded "dealer welcomes player" video segment to the player (i.e., segment (b) above) and then the making wagers game action can be completed. In some embodiments, amounts for wagers made by a player can be deducted from a player's account during block 104. The player's account can be maintained by the software application and/or by another computing device; e.g., a gaming server.

Next, at block 106, the software application can proceed to the ball launch game action and display the pre-recorded "dealer launches ball" video segment to the player (i.e. segment (c) above).

Next, at block 108, the software application can proceed to the ball landing game action where an outcome of the turn of the roulette game is determined by randomly selecting one of the pre-recorded video segments showing a ball landing in one of the positions on a roulette wheel (i.e., one of the segments in (d) above). In some embodiments, the software application can determine the outcome of the game by randomly selecting an outcome and then displaying the pre-recorded video segment corresponding to the outcome of the game.

In other embodiments, a gaming server or other computing device can determine the outcome of the game. In some of these embodiments, the gaming server (or other computing device) can provide an instruction to the software application to display a pre-recorded video segment corresponding to the outcome of the game.

At block 110, the software application can display a randomly-selected, pre-recorded video segment of the ball landing on a position on the roulette wheel (i.e. the video segment selected in block 108 above) to complete the ball landing game action.

Next, at block 112, the software application can proceed to the settling wagers game action. During this game action, if the outcome of the turn of the roulette game results in a win for the player, the software application can display the pre-recorded "dealer congratulates player" video segment to the player (i.e., segment (e) above). In some embodiments, amounts won by the player can be added to the player's account. In particular of these embodiments where wagers are deducted when made; i.e., during block 104, the settling wagers game action can be omitted if the player does not win any amount during the turn of roulette. In other of these embodiments where wagers are not deducted when made, the settling wagers game action can include deducting wager amounts from the player's account.

After the settling wagers game action has completed, another iteration of the roulette game can commence at block 102.

If, on the other hand, the outcome of the turn of the roulette game does not result in a win for the player, the next turn of the game commences at block 102.

Figure 9:
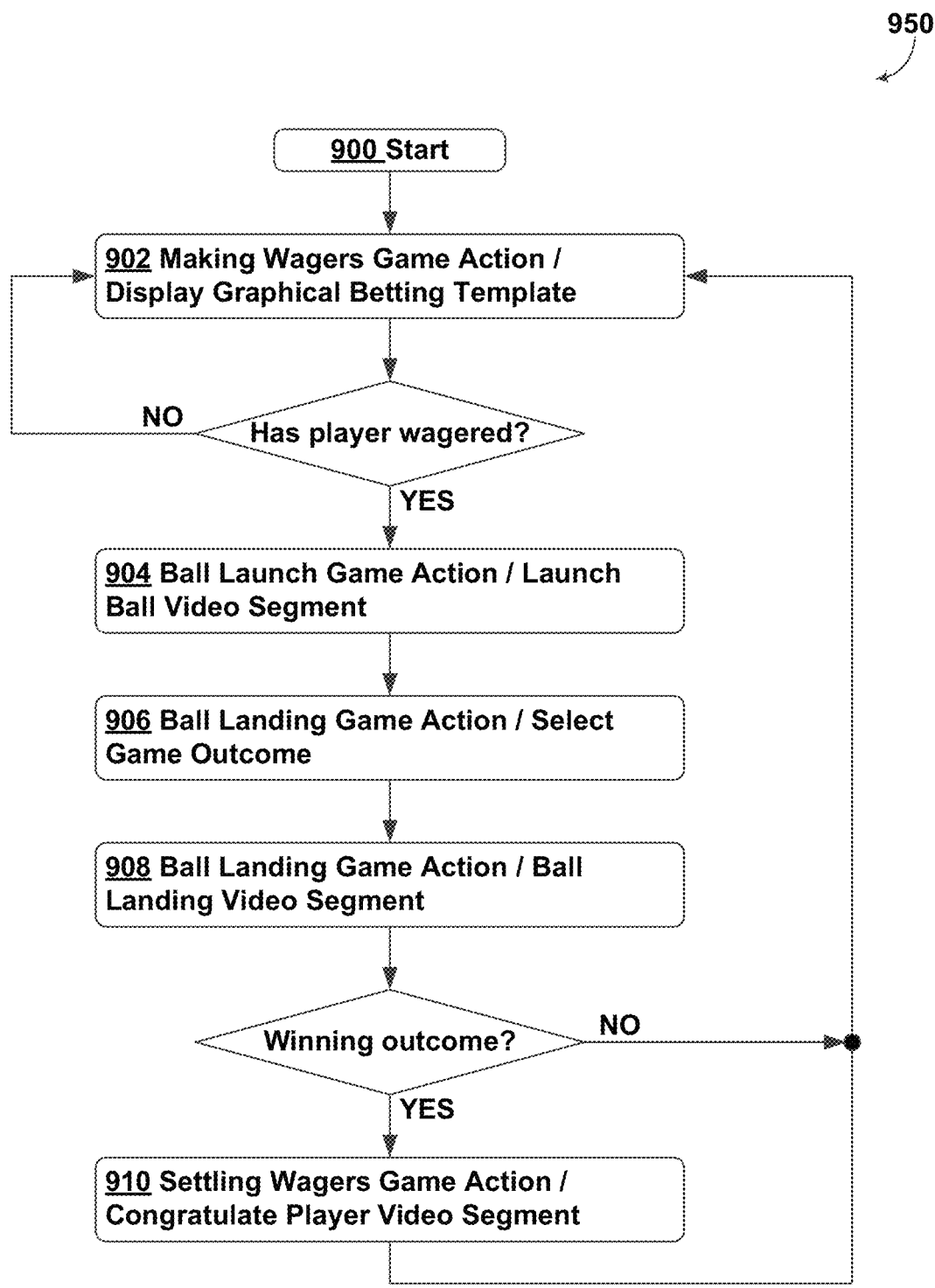
FIG. 9 is another flow chart illustrating a set of functions related to the game of roulette, in accordance with an example embodiment.

FIG. 9 is a flow chart depicting a set of functions 950 that can be carried out in accordance with another example embodiment. For example, a software application can be executed on a computing device, such as computing device 400 described below, to carry out some or all of the set of functions 950. The set of functions 950 can be performed to carry out a turn of a single-state game of roulette. The set of functions 950 are shown within blocks 900 through 910. A description of those blocks now follows.

At block 900 the player can launch a roulette game; e.g., start and/or instruct the above-mentioned software application to play the roulette game. For example, the player can provide a request via a user interface to the software application to play the roulette game.

At block 902 the software application for the roulette game can begin the making wagers game action by displaying a graphical representation of a roulette betting template, without displaying a pre-recorded video segment to the player. The displayed betting template may persist until the player has placed one or more wagers on an outcome of the turn of the roulette game and indicated that the making wagers game action can be completed. Alternatively, the displayed betting template may persist for a predetermined time, whereupon the making wagers game action may terminate. In some embodiments, amounts for wagers made by a player may be deducted from a player's account during block 902. The player's account may be maintained by the software application and/or by another computing device; e.g., a gaming server.

Next, at block 904, the software application can proceed to the ball launch game action by displaying the pre-recorded "dealer launches ball" video segment to the player (i.e., segment (c) above). The "dealer launches ball" video segment may be displayed contemporaneously with the betting template showing the player's wagers.

Next, at block 906, the software application can proceed to the ball landing game action where an outcome of the turn of the roulette game is determined by randomly selecting one of the pre-recorded video segments showing a ball landing in one of the positions on a roulette wheel (i.e., one of the segments in (d) above). In some embodiments, the software application can determine the outcome of the game by randomly selecting an outcome and then displaying the pre-recorded video segment corresponding to the outcome of the game.

At block 908, the software application can display a randomly-selected, pre-recorded video segment of the ball landing on a position on the roulette wheel (i.e., the video segment selected in block 906 above) to complete the ball landing game action.

Next, at block 910, the software application can proceed to the settling wagers game action. During this game action, the software application may display, or continue to display, as the case may be, the betting template showing the player's wagers, without displaying a pre-recorded video segment to the player. If the outcome of the turn of the roulette game does not result in a win for the player, the software application may display an animation of the player's losing wagers being cleared from the roulette betting template. If the outcome of the turn of the roulette game results in a win for the player, the software application may display an animation showing the player's winning wager, or wagers, being paid out on the roulette betting template. In some embodiments, amounts won by the player may be added to the player's account.

In particular, in these embodiments where wagers are deducted when made, i.e., during block 902, the settling wagers game action can be omitted if the player does not win any amount during the turn of the roulette game. In other embodiments where wagers are not deducted when made, the settling wagers game action can include deducting wager amounts from the player's account.

After the settling wagers game action has completed, another iteration of the roulette game can commence at block 902.

It will be appreciated that in order to increase the realism of the synthesised video stream displayed to the payer, and in order to minimise the likelihood of the player becoming aware that a live video stream is not in use, multiple versions of pre-recorded video segments (a) to (e) above can be provided. In one embodiment, N different versions of each pre-recorded video segment can be provided, where N is a positive integer greater than 1. In particular, the set (d) of video segments of the ball landing in particular positions on a roulette wheel can be considered as an N×37 (or, alternatively, an N×38) array of different pre-recorded video segments, where each row of the array comprises a subset of video segments of the ball landing in each position on the roulette wheel, and each column consists of N different pre-recorded video segments of the ball landing in the same position on the roulette wheel, but each displaying a different trajectory of the ball coming to rest.

In this embodiment, whenever a video segment, from classes (a), (b), (c) or (e) above is to be displayed to the player, it can be selected randomly from the corresponding set of N different versions of that class of video segment. Furthermore, whenever a video segment from class (d) above is to be displayed to the player, one of the N rows of the array of video segments can first be selected randomly, where after a specific video segment in the selected row can be chosen randomly for display as the outcome of the turn of the roulette game.

Alternatively, an element of the N×37 array of pre-recorded video segments can be randomly selected and the corresponding video segment displayed to the player.

The N×37 array of pre-recorded video segments of the ball landing in the specific position on the roulette wheel can be tedious to generate, particularly as the number N increases.

In an alternative embodiment, the N×37 array can be replaced by a set of N distinct pre-recorded video segments of the ball landing on the roulette wheel, each displaying a different trajectory of the ball coming to rest on the wheel. In this particular embodiment, when a video segment from class (d) above is to be displayed, a randomly-selected one of the N pre-recorded ball trajectories can be played, and a random number in the range 1 to 37 can be graphically superimposed on the rest position of the ball on the roulette wheel to represent the outcome of the turn of the roulette game.

Blackjack can provide a multi-state game example of a live action video game. For instance, the game of blackjack can be considered to have the following four blackjack game actions: a making wagers game action, a player hand game action, a dealer hand game action, and a settling wagers game action. In this example, a blackjack game sequence can be: (1) the making wagers game action takes place where a dealer can accept one or more wagers from one or more players on an outcome based on hands of cards dealt to each of the player and to the dealer, (2) the player hand game action, where the dealer deals cards to the player to determine the player's hand, (3) the dealer hand game action, where the dealer deals cards to the dealer to determine the player's hand, and (4) the settling wagers game action, where wagers made during the making wagers segment are either paid off or collected by the house depending on the outcome of the game of blackjack at the end of the dealer hand game action.

The following set of pre-recorded video segments can be provided in order to simulate a live video stream of the blackjack game:

(f) a "dealer opens betting" video segment;
(g) a "dealer waits for bets" video segment;
(h) a "dealer closes betting" video segment;
(i) a "dealer burns card" video segment;
(j) a "dealer deals 3 cards" video segment;
(k) a "dealer awaits player input" video segment;
(l) a "player hits" video segment;
(m) a "player stands" video segment;
(n) a "dealer deals dealer cards" video segment; and
(o) a "dealer congratulates player" video segment.

Figure 2:
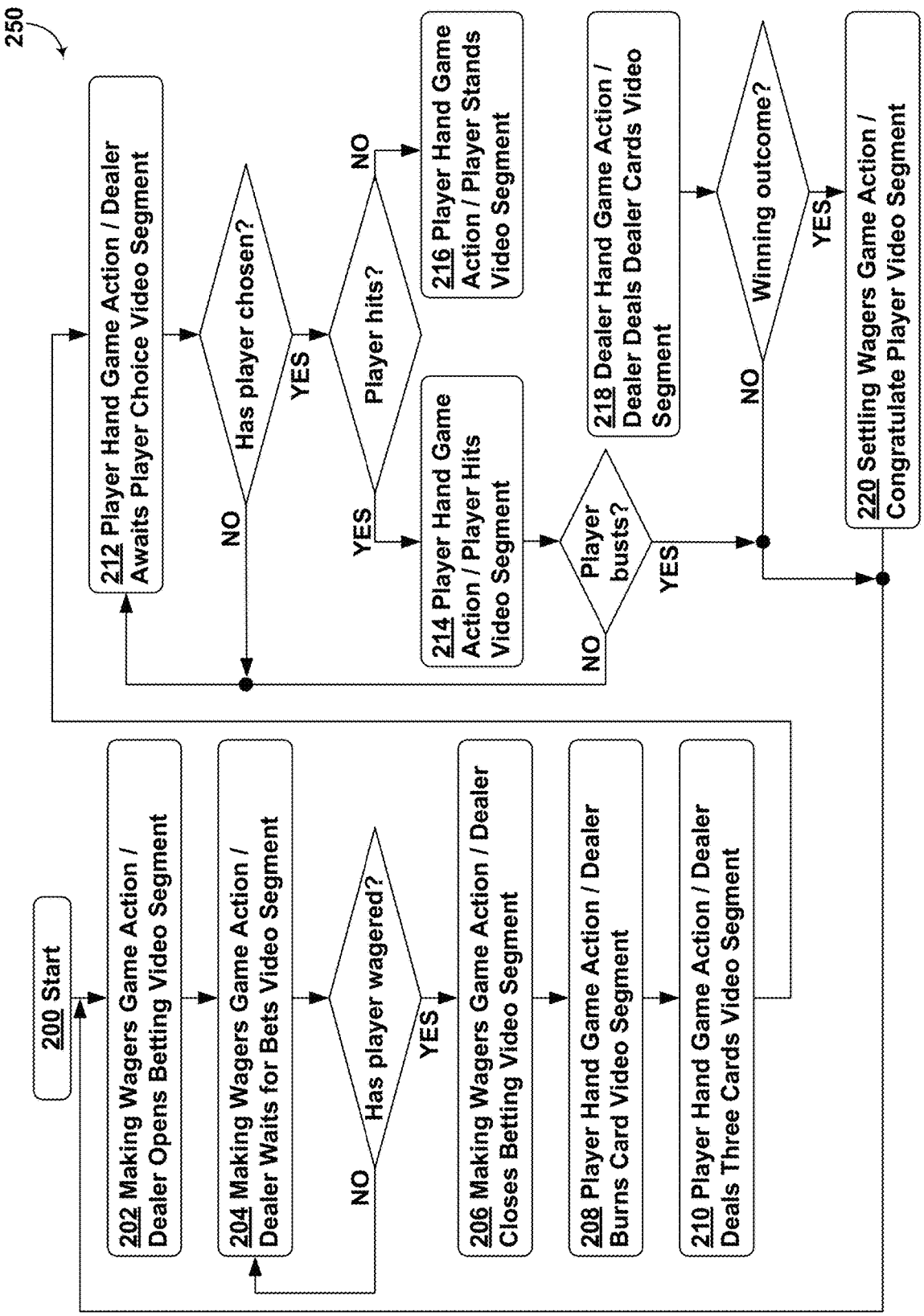
FIG. 2 is a flow chart illustrating a set of functions related to the game of blackjack, in accordance with an example embodiment.
Figure 3A:
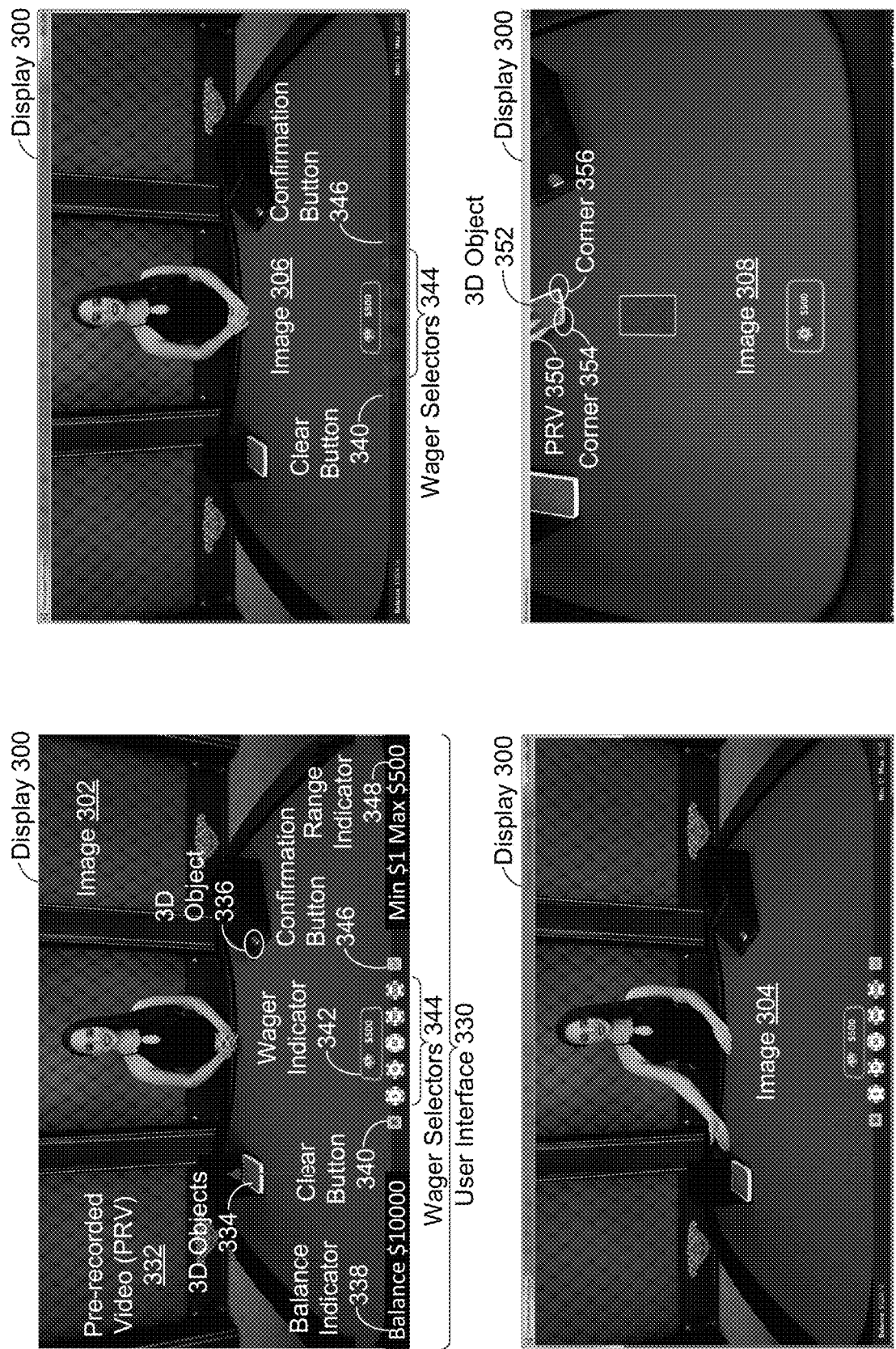
FIGS. 3A, 3B, and 3C show displays generated by a software application carrying out the set of functions related to the game of blackjack shown in FIG. 2, in accordance with an example embodiment.
Figure 3B:
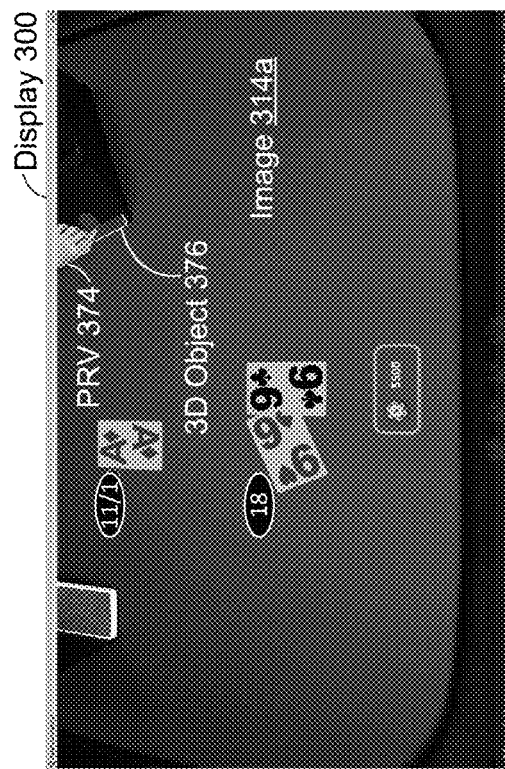
Figure 3B:
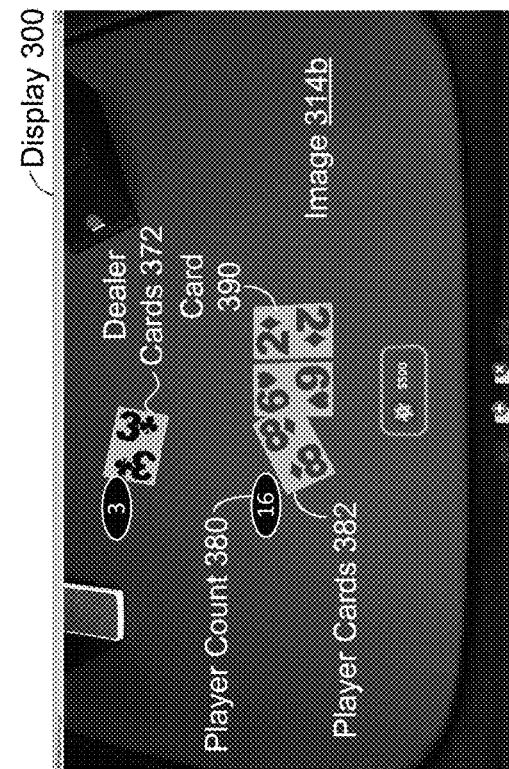
Figure 3B:
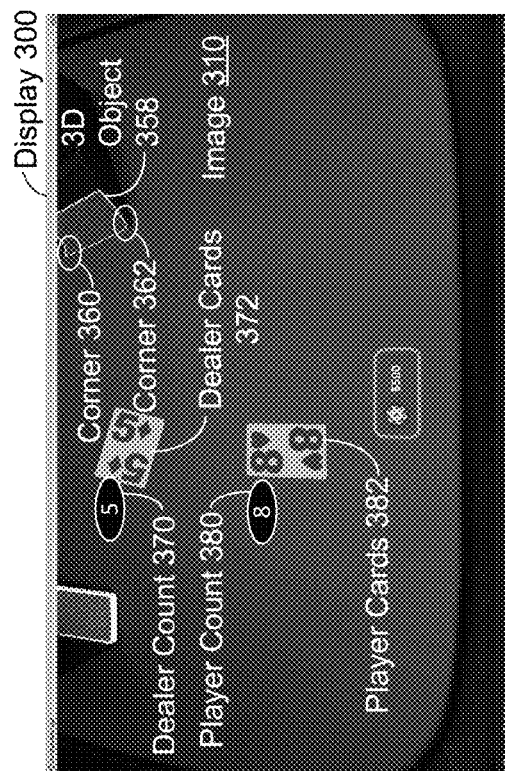
Figure 3B:
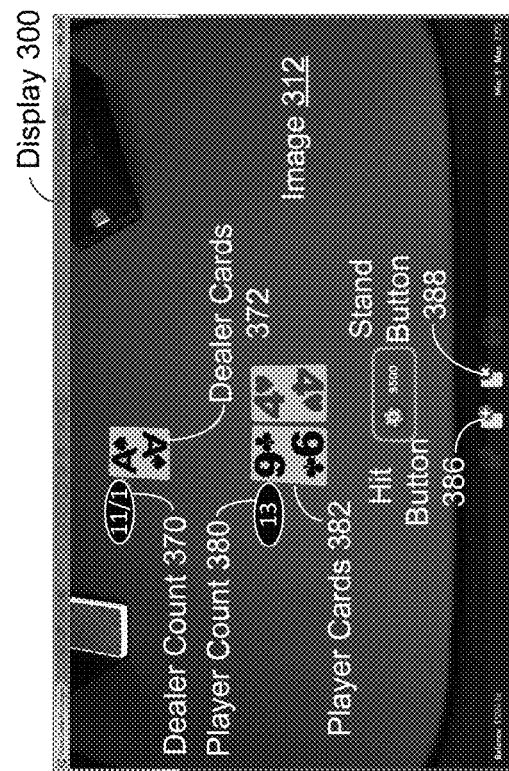
Figure 3C:
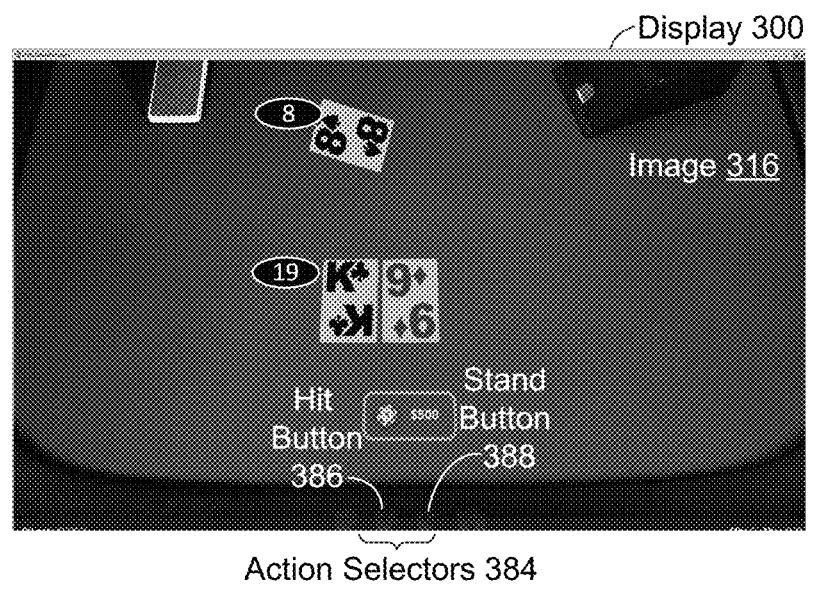
Figure 3C:
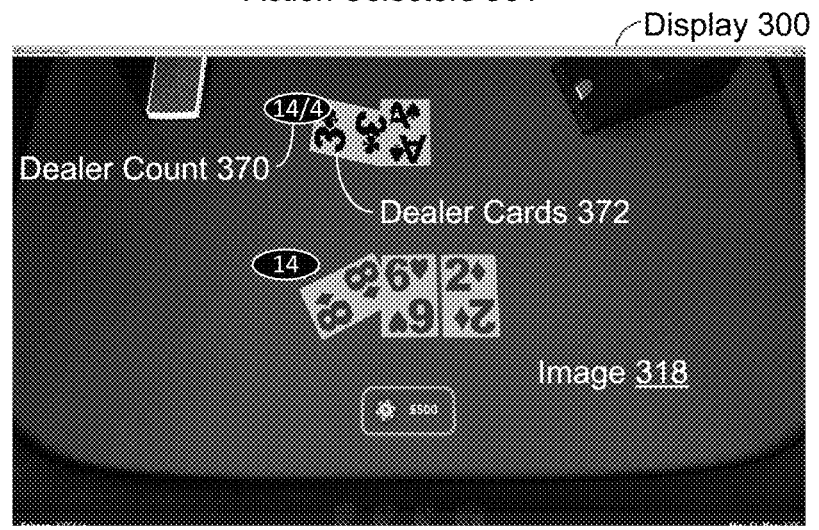
Figure 3C:
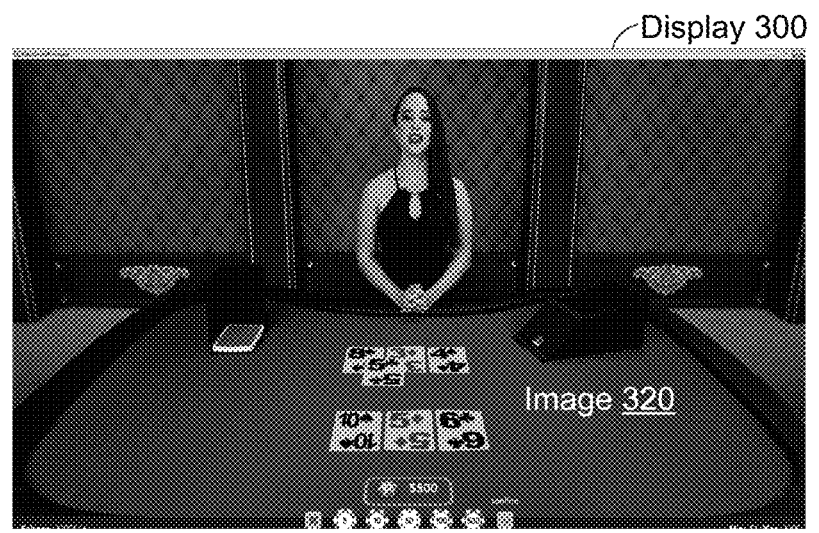

FIG. 2 is a flow chart depicting a set of functions 250 that can be carried out in accordance with an example embodiment. For example, a software application can be executed on a computing device, such as computing device 400 described below, to carry out some or all the set of functions 250. The set of functions 250 can be performed to carry out a turn of a multi-state game of blackjack. Example displays that can be generated by the software application while carrying out the set of functions 250 are shown in FIGS. 3A, 3B, and 3C as indicated below.

The set of functions are shown in blocks 200 through 220. A description of those blocks now follows.

At block 200 the player can launch the blackjack game e.g., start and/or instruct the above-mentioned software application to play the blackjack game. For example, the player can provide a request via a user interface to the software application to play the blackjack game.

At block 202 of FIG. 2, the software application can begin with the making wagers game action and displaying the pre-recorded "dealer opens betting" video segment to the player (i.e. segment (f) above). For example, an upper-left portion of FIG. 3A shows image 302 of display 300 that the software application can generate while executing block 202.

Image 302 shows that display 300 includes user interface 330, pre-recorded video (PRV) 332, and three-dimensional (3D) objects 334, 336. User interface 330 can be used by a player to instruct the computing device regarding wagers on the game of blackjack. User interface 330 includes: balance indicator 338 showing an available amount of money available for wagering, clear button 340 to clear a current wager amount, wager indicator 342 showing the current wager amount, wager selectors 344 enabling selection of wager amounts, confirmation button 346 to confirm, and thus place, a wager, and range indicator 348 indicating a range of acceptable wagers. In the example shown in image 302, wager indicator 342 shows the current wager amount of $500 which is within the $1-$500 range of acceptable wagers shown by range indicator 348. In other embodiments, more, fewer, and/or different controls and/or information can be provided by user interface 330.

Pre-recorded video 332 of image 302 shows a female blackjack dealer recorded while opening betting. In some examples, audio can be provided as part of pre-recorded video 332; e.g., the dealer can introduce herself (or in other examples, himself), welcome the player to the table, and perhaps make additional introductory comments. 3D objects 334 illustrate a stack of playing cards, and 3D object 336 illustrates a playing card in a card shoe. In other examples, other objects than playing cards can be depicted and used as 3D objects in display 300 and/or other displays generated by the software application.

At block 204 of FIG. 2, the software application can continue the making wagers game action of the blackjack game by displaying the pre-recorded "dealer waits for bets" video segment to the player (i.e. segment (g) above). For example, a lower-left portion of FIG. 3A shows image 304 of display 300 that the software application can generate while executing block 204. Image 304 shows that display 300 includes a user interface, pre-recorded video, and 3D objects that are consistent with respective user interface 330, pre-recorded video 332, and 3D objects 334, 336 described above in the context of image 302.

As illustrated by the flowchart of FIG. 2, the "dealer waits for bets" video segment can continue to be displayed; i.e., block 204 is repeated, until the player has placed a wager on the outcome of the turn of the blackjack game. Once a player has placed a wager, the software application can proceed to block 206. In some embodiments, amounts for wagers made by a player can be deducted from a player's account during block 204. The player's account can be maintained by the software application and/or by another computing device; e.g., a gaming server.

At block 206, once the player has completed wagering, the software application can continue the making wagers game action by displaying the pre-recorded "dealer closes betting" video segment to the player (i.e. segment (h) above). For example, an upper-right portion of FIG. 3A shows image 306 of display 300 that the software application can generate while executing block 206. Image 306 shows that display 300 includes pre-recorded video and 3D objects that are consistent with respective pre-recorded video 332 and 3D objects 334, 336 described above in the context of image 302. However, image 306 shows that display 300 includes dimmed (i.e., greyed-out) elements of user interface 330, such as clear button 340, bet selectors 344, and confirmation button 346, to indicate that betting has closed and, as such, the dimmed elements of user interface 330 are no longer available for the player's use.

At block 208 of FIG. 2, the software application can display the pre-recorded "dealer burns card" video segment to the player (i.e. segment (i) above) as part of the player hand game action. For example, a lower-right portion of FIG. 3A shows image 308 of display 300 that the software application can generate while executing block 208. Image 308 shows that pre-recorded video 350 shown in the "dealer burns card" video segment includes the dealer's hand moving a card along a blackjack table. Image 308 also shows that display 300 includes a wager indicator similar to wager indicator 342 described above in the context of image 302.

Image 308 further shows that display 300 also includes 3D objects that can be generated by the software application, including 3D object 352, representing playing cards. Other 3D objects are possible as well. The 3D objects can be integrated with pre-recorded video, such as pre-recorded video 350, to display realistic three-dimensional behavior and so enhance the player's perception of playing a live game of chance. In particular, at upper-center of image 308, pre-recorded video 350 shows the dealer's hand appearing to move a card, representing 3D object 352. As 3D object 352 moves along the blackjack table, corner 354 of 3D object 352 is turned up relative to corner 356, realistically simulating bending of a playing card while being burned (i.e., discarded) to indicate three dimensionality of 3D object 352. If the playing card represented by 3D object 352 were a two dimensional simulation, the playing card would not bend in a realistic fashion; therefore, the turning up of corner 354 of 3D object 352 illustrates three dimensionality of 3D object 352.

At block 210 of FIG. 2, the software application can display the pre-recorded "dealer deals 3 cards" video segment to the player (i.e. segment (j) above) as part of the player hand game action. During block 210, the dealer can deal three cards from the card shoe—two cards for the player and a single card for the dealer. The identity of any dealt card can be represented to the player by means of a graphic representation of a card face shown in a 3D object superimposed on pre-recorded video.

For example, an upper-left portion of FIG. 3B shows image 310 of display 300 that the software application can generate while executing block 210. Image 310 includes 3D object 358, dealer count indicator 370, dealer cards 372, player count indicator 380, and player cards 382 while the dealer is dealing the third card of the "dealer deals 3 cards" video segment. In the example shown in image 310, dealer cards 372 indicate the dealer has one card—the five of diamonds—with a corresponding count of 5 as shown by dealer count indicator 370, and player cards 382 indicate the player has one card—the eight of hearts—with a corresponding count of 8 as shown by player count indicator 380. 3D object 358 illustrates the third card being dealt, which is shown as bent near corners 360 and 362 while coming out of the card shoe as indicia of the three dimensionality of 3D object 358.

At block 212 of FIG. 2, the software application can display the pre-recorded "dealer awaits player input" video segment to the player (i.e. segment (k) above) as part of the player hand game action.

For example, a lower-left portion of FIG. 3B shows image 312 of display 300 that the software application can generate while executing block 212. Image 312 shows dealer count indicator 370, dealer cards 372, player count indicator 380, player cards 382, and action selectors 384 while the software application awaits input after the three cards of block 210 have been dealt. In the example shown in image 312, dealer cards 372 indicate the dealer has one card—the ace of spades—which can have a count of either 1 or 11 as shown by dealer count indicator 370, and player cards 382 indicate the player has two cards—the nine of clubs and the four of hearts—having a corresponding count of 13 as shown by player count indicator 380.

Image 312 also shows action selectors 384, which include hit button 386 and stand button 388, that the software application can provide to enable player input. The player can select hit button 386 to instruct the software application to take a hit; i.e., elect to take another card. Alternatively, the player can select stand button to stand; i.e., elect to stop taking cards. In other embodiments, more, fewer, and/or different action selectors 384 can be provided by the software application.

The "dealer awaits player input" video segment can continue to be displayed until the player has exercised a required game play choice, for example, whether to hit or to stand. If the player decides to hit (e.g., selects hit button 386), the software application can proceed to block 214. Otherwise, if the player decides to stand (e.g., selects hit button 386), the software application can proceed to block 216.

At block 214 of FIG. 2, the player has elected to hit. Then, the software application can display the pre-recorded "player hits" video segment to the player (i.e. segment (l) above) as part of the player hand game action. This video segment can show a further card being dealt to the player's hand.

For example, an upper-right portion of FIG. 3B shows image 314*a* of display 300 that the software application can generate while executing block 214. Image 314*a* shows pre-recorded video 374 of a dealer's hand dealing a hit card, which is represented by 3D object 376. Then, a lower-right portion of FIG. 3B shows image 314*b* of display 300 that the software application can generate while continuing execution of block 214. In the example shown in image 314*b*, dealer cards 372 indicate the dealer has one card—the three of clubs—having a count of 3 as shown by dealer count indicator 370. Image 314*b* includes player cards 382 that indicate, in this example, the player was initially dealt the eight of diamonds and six of hearts, and has taken the two of diamonds as a hit card, for a corresponding count of 16 as shown by player count indicator 380.

Once the player takes a hit, the player's count is increased by the count of the hit card. If the subsequent player count exceeds 21, the player "busts" and loses the game. If the player busts, the player's wager can be deducted from the player's account, if not previously deducted, and the software application can proceed to block 202 for another turn of the blackjack game. Alternatively, if the player does not bust (such as shown in the example of image 314*b*), the software application can proceed to block 212.

At block 216 of FIG. 2, the player has elected to stand. In accord with that election, the software application can display the pre-recorded "player stands" video segment of the player hand game action to the player (i.e. segment (m) above). For example, an upper portion of FIG. 3C shows image 316 of display 300 that the software application can generate while executing block 216. As the player has elected to stand, the player can take no further action, as indicated by the greyed-out hit button 386 and stand button 388 shown in image 216. Once the procedures of block 216 have completed, the software application can proceed to block 218.

At block 218 of FIG. 2, the software application can display the pre-recorded "dealer deals dealer cards" video segment to the player (i.e. segment (n) above) as part of the dealer hand game action. This video segment can show one or more cards being dealt to the dealer's hand according to rules of the blackjack game. For example, a middle portion of FIG. 3C shows image 318 of display 300 that the software application can generate while executing block 218. Image 318 shows dealer count indicator 370 and dealer cards 372 while the software application deals cards to the dealer. In the example shown in image 318, dealer cards 372 indicate the dealer has two cards—the ace of spades and the three of clubs—which can have a count of either 4 or 14 as shown by dealer count indicator 370.

If an outcome had not already been determined prior to the dealer hand segment (e.g., if the player had not busted), the software application can determine the outcome after the dealer hand segment based on the rules of the game of blackjack. That is, the player either: (a) wins, if the player count is higher than the dealer count; (b) loses, if the player count is less than the dealer count; or (c) ties (or "pushes"), if the player count equals the dealer count. In embodiments where wagers are deducted when made; i.e., during block 204, the settling wagers game action can be omitted if the player loses during the turn of blackjack. In other of these embodiments where wagers are not deducted when made, the settling wagers game action can include deducting wager amounts from the player's account if the player loses or adding wager amount from the player's account if the player wins.

If the outcome of the turn of the blackjack game results in a win for the player, the software application can proceed to block 220. If, on the other hand, the outcome of the turn of the blackjack game does not result in a win for the player, the software application can proceed to block 202 to commence another next turn of the game. At block 220 of FIG. 2, the software application can display the pre-recorded "dealer congratulates player" video segment to the player (i.e. item (o) above) as part of the settling wagers game action. For example, a lower portion of FIG. 3C shows image 320 of display 300 that the software application can generate while executing block 220. In some embodiments, pre-recorded video of the "dealer congratulates player" video segment can have the dealer provide congratulatory remarks to the player and/or encourage the player to play another turn of the game. Once the procedures of block 220 have completed, the software application can proceed to block 202 to commence another next turn of the game.

As described above, in connection with the roulette embodiment, in order to minimise the likelihood of the player becoming aware that a live video stream is not in use, multiple versions of pre-recorded video segments (f) to (o) above can be provided. In particular, M different versions of each pre-recorded video segment can be provided, where M is a positive integer greater than 1. In these embodiments, whenever a video segment (f) to (o) above is to be displayed to the player, it can be selected randomly from the corresponding set of M different versions of that class of video segment.

III. Example Architecture

Figure 4:
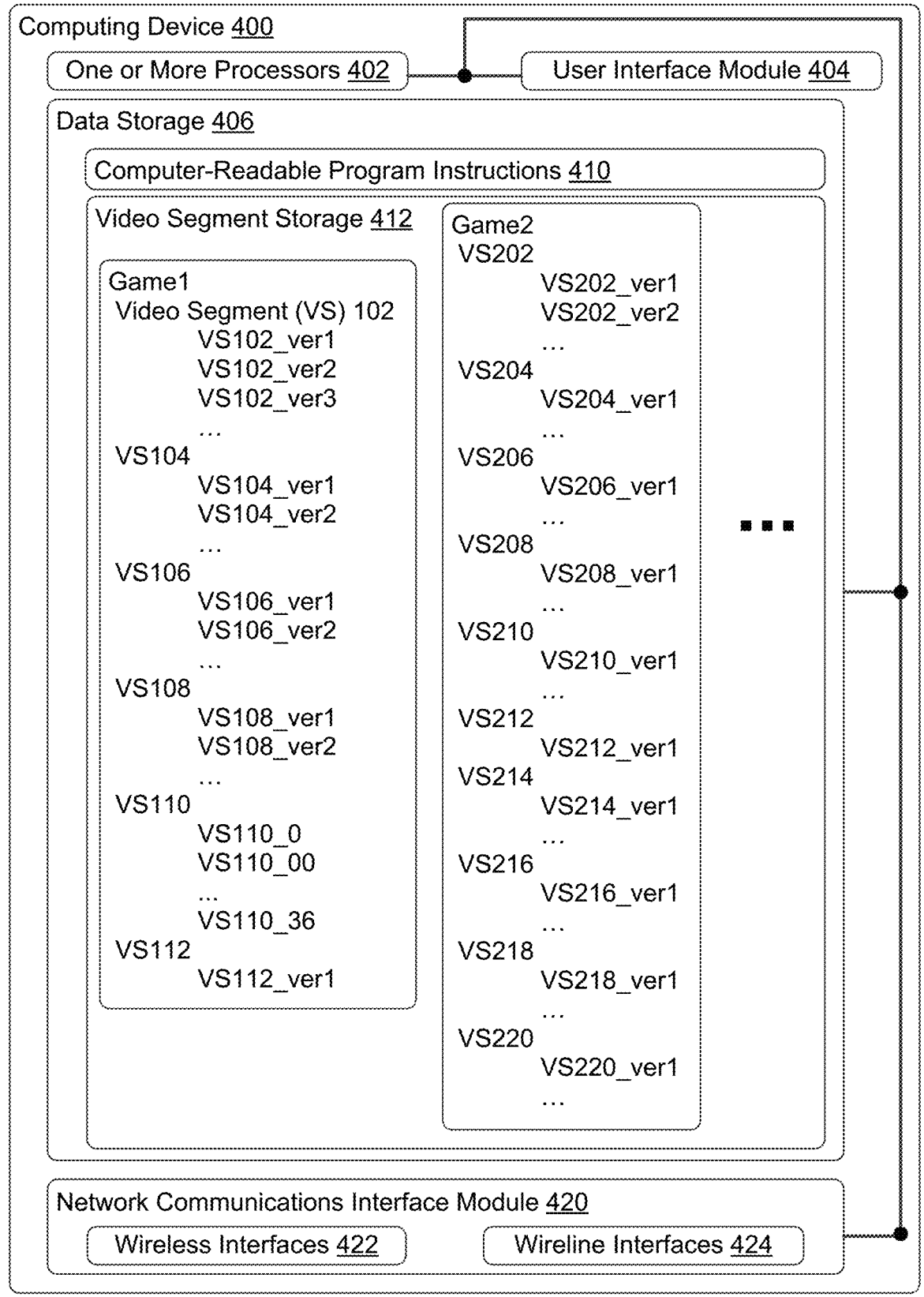
FIG. 4 is a block diagram of a computing device, in accordance with an example embodiment.

FIG. 4 is a block diagram of computing device 400, in accordance with an example embodiment. In particular, computing device 400 can be configured to perform at least one function related: set of functions 150, set of functions 250, a software application, display 300, scenario 500, computing device 502, gaming server 504, scenario 600, computing device 602, scenario 700, computing device 702, and/or method 800. Computing device 400 can include one or more processors 402, a user interface module 404, data storage 406, and network-communication interface module 420, all of which can be linked together via a system bus, network, or other connection mechanism.

Processors 402 can include one or more general purpose processors and/or one or more special purpose processors. Processors 402 that can be configured to execute computer-readable program instructions 410 that are contained in data storage 406, software applications, and/or other instructions as described herein. For example, processors 402 can comprise one or more general purpose processors (e.g., INTEL single core microprocessors or INTEL multicore microprocessors) and/or one or more special purpose processors (e.g., application-specific integrated circuits (ASICs), graphics processing units (GPUs), field-programmable gate array (FPGAs), and/or digital signal processors (DSPs)).

User interface module 404 can be operable to send data to and/or receive data from external user input/output devices. For example, user interface module 404 can be configured to send and/or receive data to and/or from user input devices such as a keyboard, a keypad, a touch screen, a computer mouse, a track ball, a joystick, a camera, a voice recognition module, and/or other similar devices. User interface module 404 can also be configured to provide output to user display devices, such as one or more cathode ray tubes (CRT), liquid crystal displays, light emitting diodes (LEDs), displays using digital light processing (DLP) technology, printers, light bulbs, and/or other similar devices. User interface module 404 can also include one or more devices configured to generate audible output(s), such as a speaker, speaker jack, audio output port, audio output device, earphones, and/or other similar devices. Further, in some embodiments, user interface module 404 can also include one or more devices configured to generate haptic output(s) such as forces, vibrations, and/or motions detectable at least by a user's sense of touch.

Data storage 406 can include one or more computer-readable storage media that can be read and/or accessed by at least one of processors 402. The one or more computer-readable storage media can include volatile and/or non-volatile storage components, such as optical, magnetic, organic or other memory or disc storage, which can be integrated in whole or in part with at least one of processors 402. In some embodiments, data storage 406 can be implemented using a single physical device (e.g., one optical, magnetic, organic or other memory or disc storage unit), while in other embodiments, data storage 406 can be implemented using two or more physical devices.

Data storage 406 can include computer-readable program instructions 410 and perhaps additional data, such as but not limited to video segments stored in video segment storage 412. FIG. 4 shows that video segment storage 412 can store video segments related to one or more games of chance, such as "Game1" and "Game2". Video segment storage 412 for Game1 can include video segments (VSs) 102, VS104, VS106, VS108, VS110, and VS112 corresponding to respective blocks 102, 104, 106, 108, 110, and 112 of set of functions 150; i.e., Game1 can be roulette. Video segment storage 412 for Game2 can include video segments VS202, VS204, VS206, VS208, VS210, VS212, VS214, VS216, VS218, and VS220, corresponding to respective blocks 202, 204, 206, 208, 210, 212, 214, 216, 218, and 220 of set of functions 250; i.e., Game2 can be blackjack. In other embodiments, video segment storage 412 can store more, fewer, and/or different video segments than shown in FIG. 4.

As mentioned above, a video segment can be one or more files and/or or other storage units for storing video data, and perhaps related audio data. The video segment can be stored using one or more video file formats, such as but not limited to, Audio Video Interleave (AVI), Windows Media Video (WMV), Advanced Systems Format (ASF), QuickTime, H.264, Advanced Video Coding High Definition (AVCHD), Flash Video, Motion Picture Experts Group (MPEG)-1, MPEG-2, MPEG-4, and DivX. In particular, a video segment can include pre-recorded video and/or audio data recording one or more segments of a "live game play sequence"; that is, a recording of one or more persons, such as a dealer and/or a croupier, involved in playing a game of chance.

Each of the video segments can have one or more versions. For example, video segment VS102 is shown having at least three versions: a first version video segment named "VS102_ver1", a second version video segment "VS102_ver2", and a third version video segment "VS102_ver3". Each version can show a respective instance of a particular game action being performed by a person (e.g., a dealer or croupier). However, the performance of the particular game action can vary between different versions. In general, the particular action could be performed by different persons in different versions, or could be performed in different ways by the same person. In some implementations, the different versions can have different durations. For example, the first version of the VS102 video segment related to an idle dealer can show a dealer waiting for 10 seconds, the second version of the VS102 video segment related to an idle dealer can show a dealer waiting for 20 seconds, and a third version of the VS102 video segment related to an idle dealer can show a dealer waiting for 60 seconds.

In some implementations, different versions can be provided having different languages. As another example, the first version of the VS102 video segment related to an idle dealer can have a dealer making an introduction in Mandarin, the second version of the VS102 video segment can have a dealer making an introduction in Cantonese, a third version of the VS102 video segment can have a dealer making an introduction in English, and a fourth version of the VS102 video segment related to an idle dealer can show a dealer silently waiting for 60 seconds; i.e., the fourth video segment has no particular language associated with it. In still other examples, different versions can be provided to accommodate user disabilities; e.g., a dealer can use sign language rather than speaking for hearing-impaired players, close-ups can be used to better display the dealer for visually-impaired players, outcomes can be announced audibly and/or provided visually, larger sized cards/count indicators can be used, etc.

Different versions can be provided having different outcomes. For example, the VS110 video segment associated with a roulette ball landing can have 38 different outcomes—one for the roulette ball landing in a "0" slot, one for the roulette ball landing in a "00" slot, one for the roulette ball landing in a "1" slot, . . . , and one for the roulette ball landing in a "36" slot. As another example, one version of a video segment related to settling wagers can show a dealer providing encouragement to a losing player while another version of a video segment related to settling wagers can show a dealer congratulating a winning player. Many other example video segments of different durations, languages, and outcomes are possible as well.

A set of versions of a video segment can include different versions for different criteria; e.g., a set of nine versions of the VS102 video segment can include three Mandarin-language versions having respective durations of 10, 20, and 60 seconds, three Cantonese-language versions having respective durations of 10, 20, and 60 seconds, and three English-language versions having respective durations of 10, 20, and 60 seconds. Then, the software application can select a particular version from among the set of versions based on user input, user responses, randomly, default values, and/or other criteria. Continuing the set of nine versions of the VS102 video segment example above, a player can be queried to determine a language of preference; e.g., Mandarin, Cantonese, or English. Then, a video segment can be selected from among the set of versions; e.g., the 20 second Mandarin-language version of the VS102 video segment can be initially played by default for a Mandarin-language player. Based on player response times and/or player selection, the software application can use the faster 10-second Mandarin-language version for a relatively-fast acting player, maintain use of the default 20-second Mandarin-language version for a moderate speed player, or use the slower 60-second Mandarin-language version for a relatively-slow acting player. Further, different versions and sets of versions of video segments can have different variations than between durations, languages, and outcomes; e.g., versions for different locations/backdrops, versions with and without audio, versions with different dealers, versions associated with different gaming entities, etc.

In some embodiments, data storage 406 can additionally include storage required to perform at least part of the herein-described methods and techniques and/or at least part of the functionality of the herein-described devices.

Network-communications interface module 420 can include one or more wireless interfaces 422 and/or one or more wireline interfaces 424 that are configurable to communicate via a network. Wireless interfaces 422 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 424 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 420 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

In some embodiments, computing device 400 can include one or more sensors. The sensor(s) can be configured to measure conditions in an environment for computing device 400 and provide data about that environment. For example, the sensor(s) can include one or more of: (i) an identification sensor to identify other objects and/or devices, such as, but not limited to, an RFID reader, proximity sensor, one-dimensional barcode reader, two-dimensional barcode (e.g., Quick Response (QR) code) reader, and a laser tracker, where the identification sensor(s) can be configured to read identifiers, such as RFID tags, barcodes, QR codes, and/or other devices and/or object configured to be read and provide at least identifying information; (ii) a location sensor to measure locations and/or movements of the computing device 400, such as, but not limited to, a gyroscope, an accelerometer, a Doppler sensor, a Global Positioning System (GPS) device, a sonar sensor, a radar device, a laser-displacement sensor, and a compass; (iii) an environmental sensor to obtain data indicative of an environment of computing device 400, such as, but not limited to, an infrared sensor, an optical sensor, a light sensor, a camera, a biosensor, a capacitive sensor, a touch sensor, a temperature sensor, a wireless sensor, a radio sensor, a movement sensor, a microphone, a sound sensor, an ultrasound sensor, and/or a smoke sensor. Many other examples of sensor(s) are possible as well.

Each computer-readable storage medium (or, more simply "readable medium") described in this disclosure can include a non-transitory computer-readable medium that includes volatile and/or non-volatile storage components such as optical, magnetic, organic or other memory or disc storage, which can be integrated in whole or in part with a processor. Additionally or alternatively, each computer-readable medium described in this disclosure can include a transitory computer-readable medium. The transitory computer-readable medium can include, but is not limited to, a communications medium such as a digital or analogue communications medium (e.g., a fibre optic cable, a waveguide, a wired communication link, or a wireless communication line).

A network interface, such as network interface communication interface module 420 or any other network interface disclosed herein, can include an interface to one or more networks and/or communication channels. For example, the network interface can include one or more transmitters configured for transmitting data using the one or more networks and/or communication channels, one or more receivers configured for receiving data using the one or more networks and/or communication channels, and/or one or more transceivers configured to both transmit and receive data using the one or more networks and/or communication channels. In particular, the network interface can be used enable communications between one or more computing devices used by players and one or more gaming servers used to play games of chance and/or provide player accounting services (e.g., player identification, settling of wagers, etc.)

The network interface can further include one or more receivers configured to receive data transmitted over the network or communication channel from another device within or on the network or communication channel. Any of the network interfaces disclosed herein can include circuitry, for example electronic circuitry, for converting data received from the network or communication channel to data that can be provided to a processor for processing the received data. For example, the circuitry of the network interfaces can include a modulator and/or demodulator (modem). Any of the network interfaces disclosed herein can include circuitry, for example electronic circuitry, for converting data received from another device, such as a processor or a computer-readable medium, to data in a form that can be transmitted over a network or communication channel.

IV. Example Communication Flows

Figure 5:
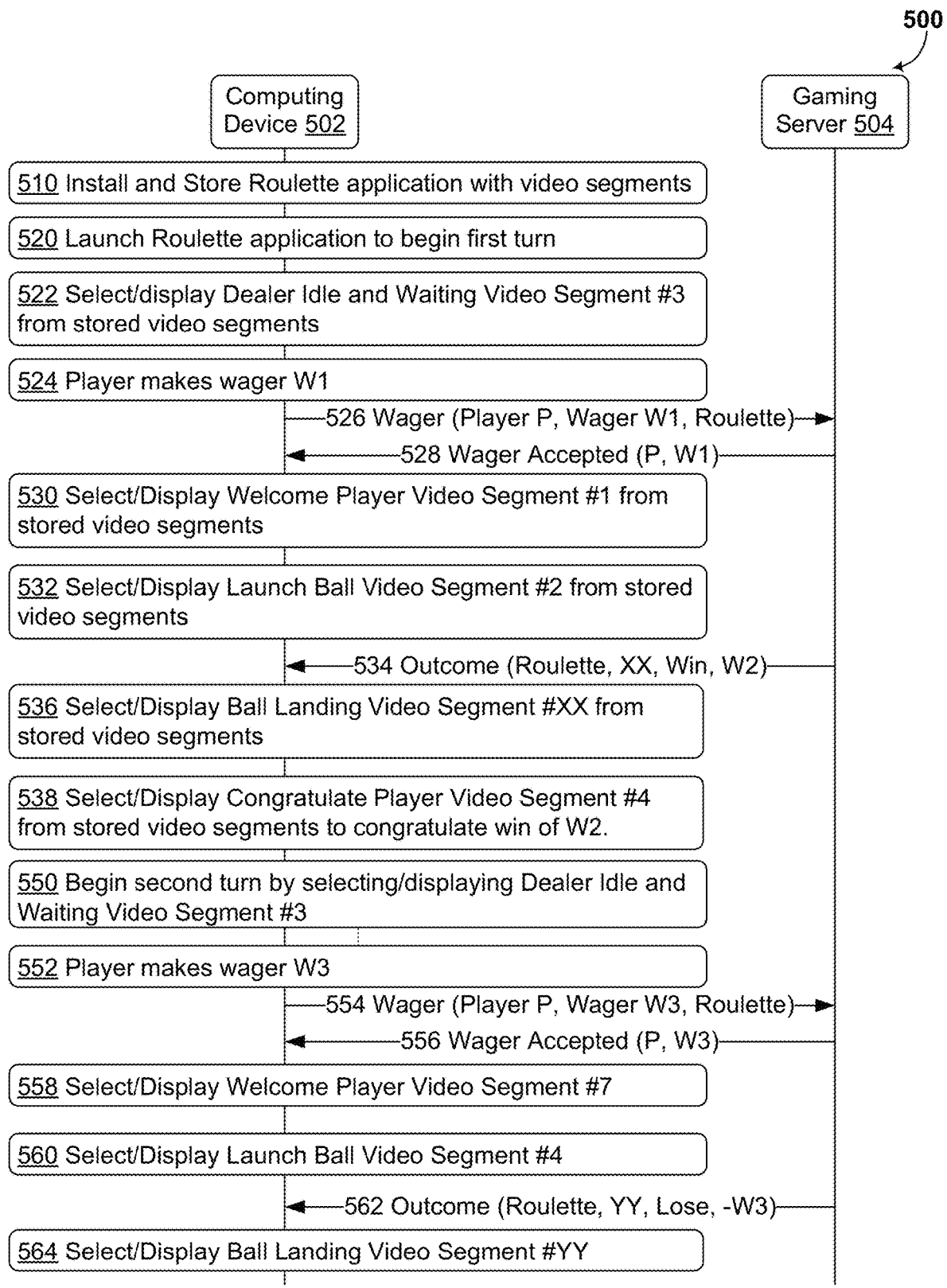
FIG. 5 illustrates a communication flow between a computing device and a gaming server related to two turns of the game of roulette, in accordance with an example embodiment.
Figure 6A:
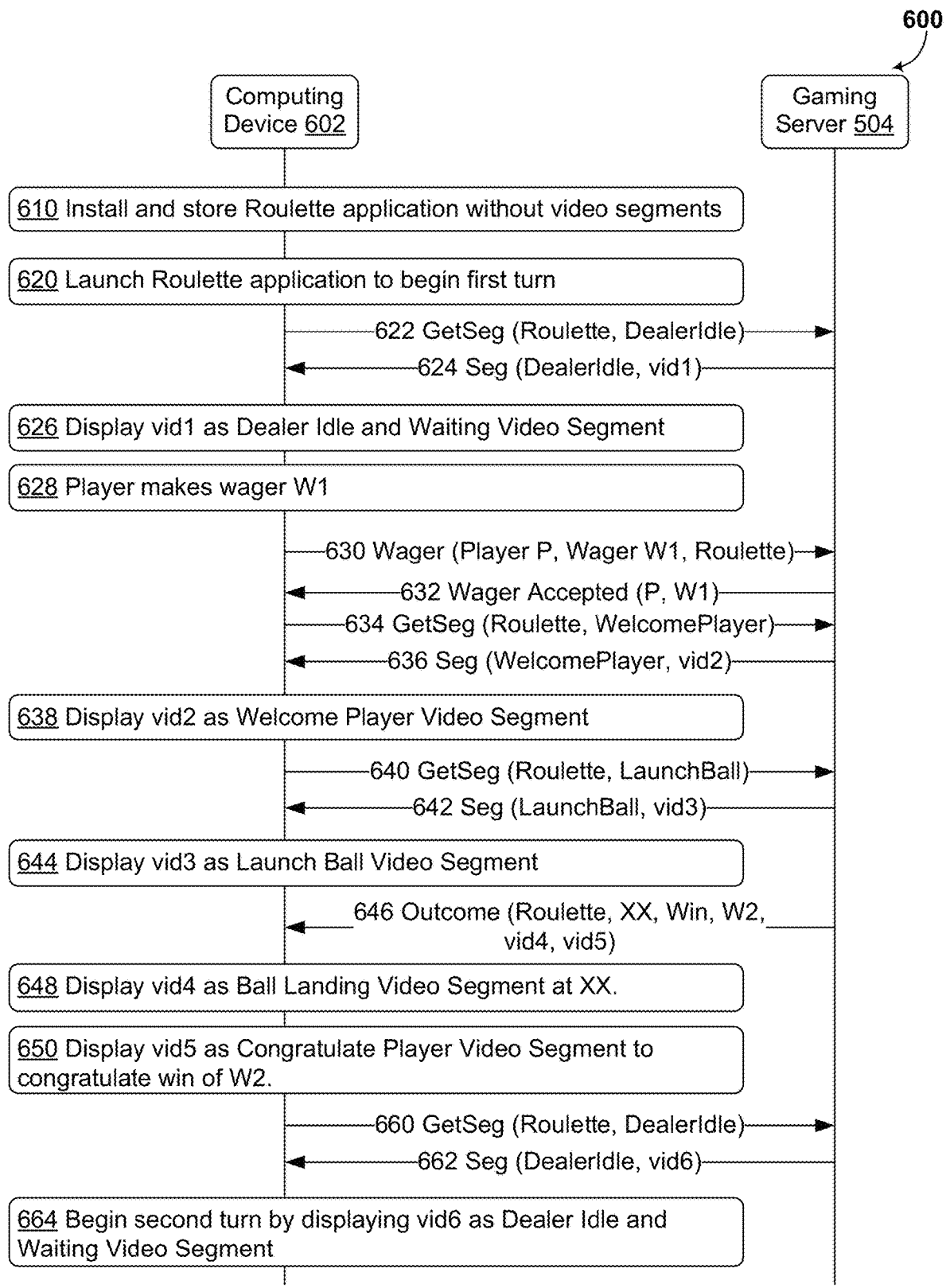
FIGS. 6A and 6B illustrate another communication flow between a computing device and a gaming server related to two turns of the game of roulette, in accordance with an example embodiment.
Figure 6B:
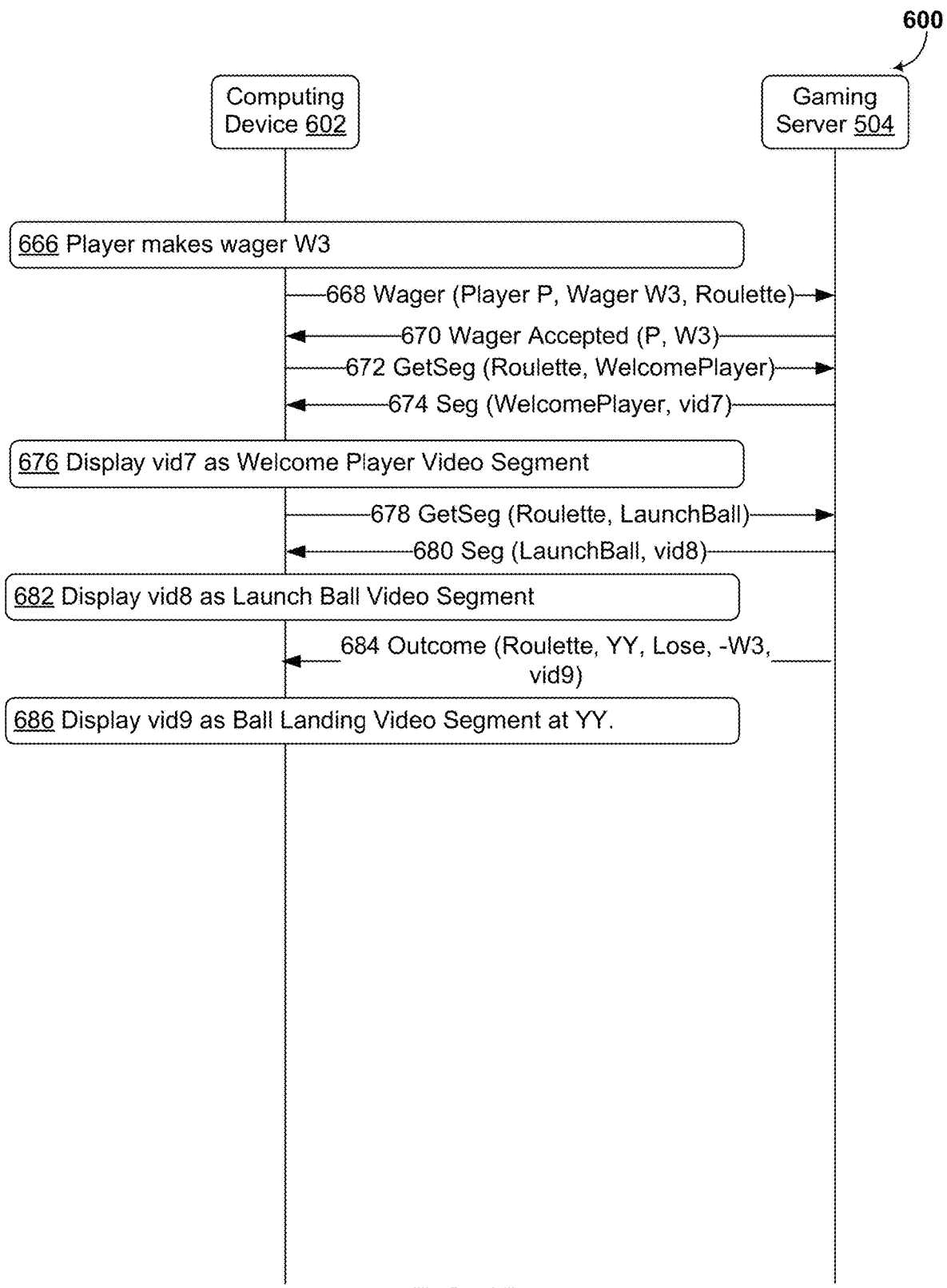
Figure 7A:
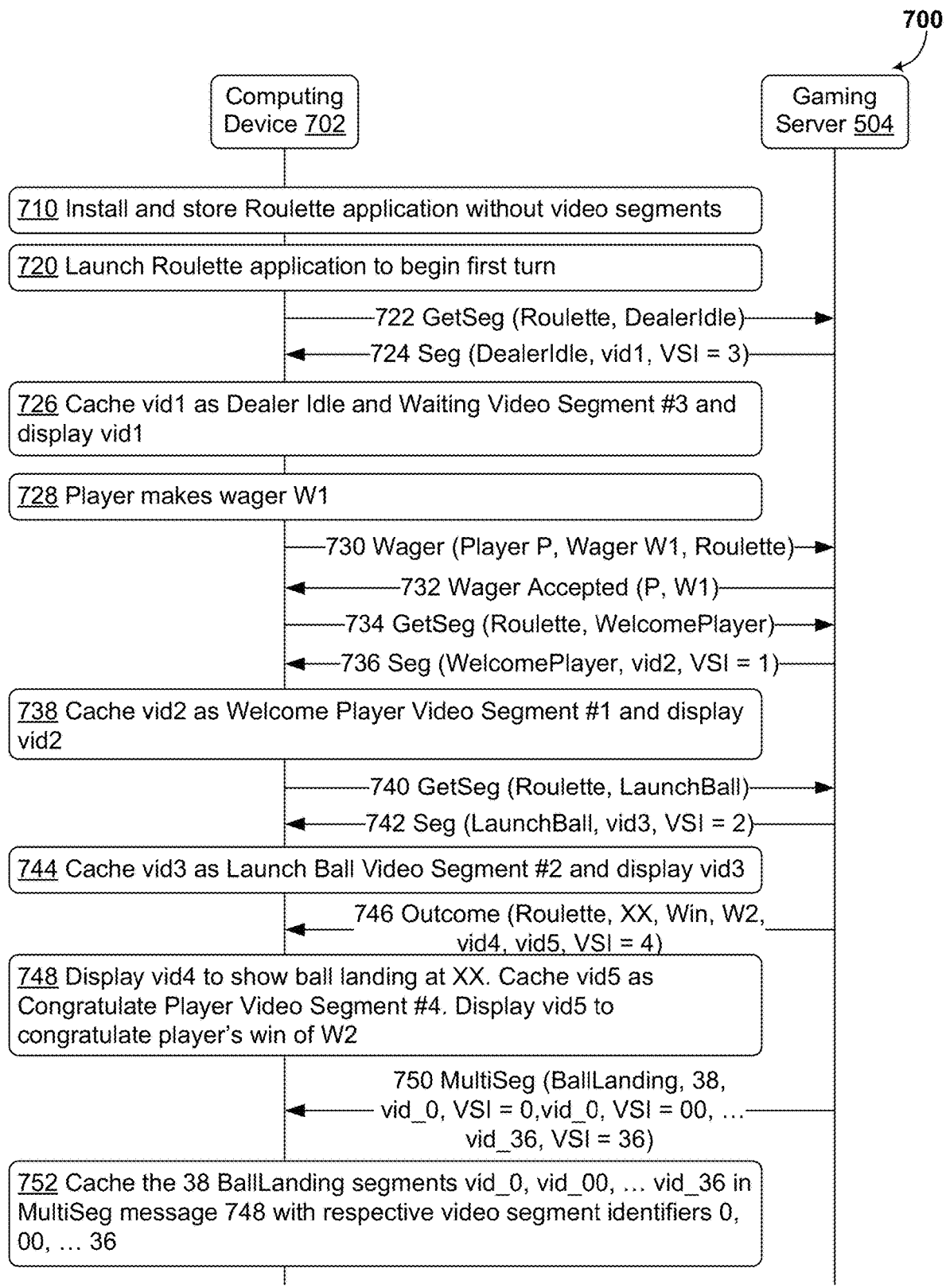
FIGS. 7A and 7B illustrate yet another communication flow between a computing device and a gaming server related to two turns of the game of roulette, in accordance with an example embodiment.
Figure 7B:
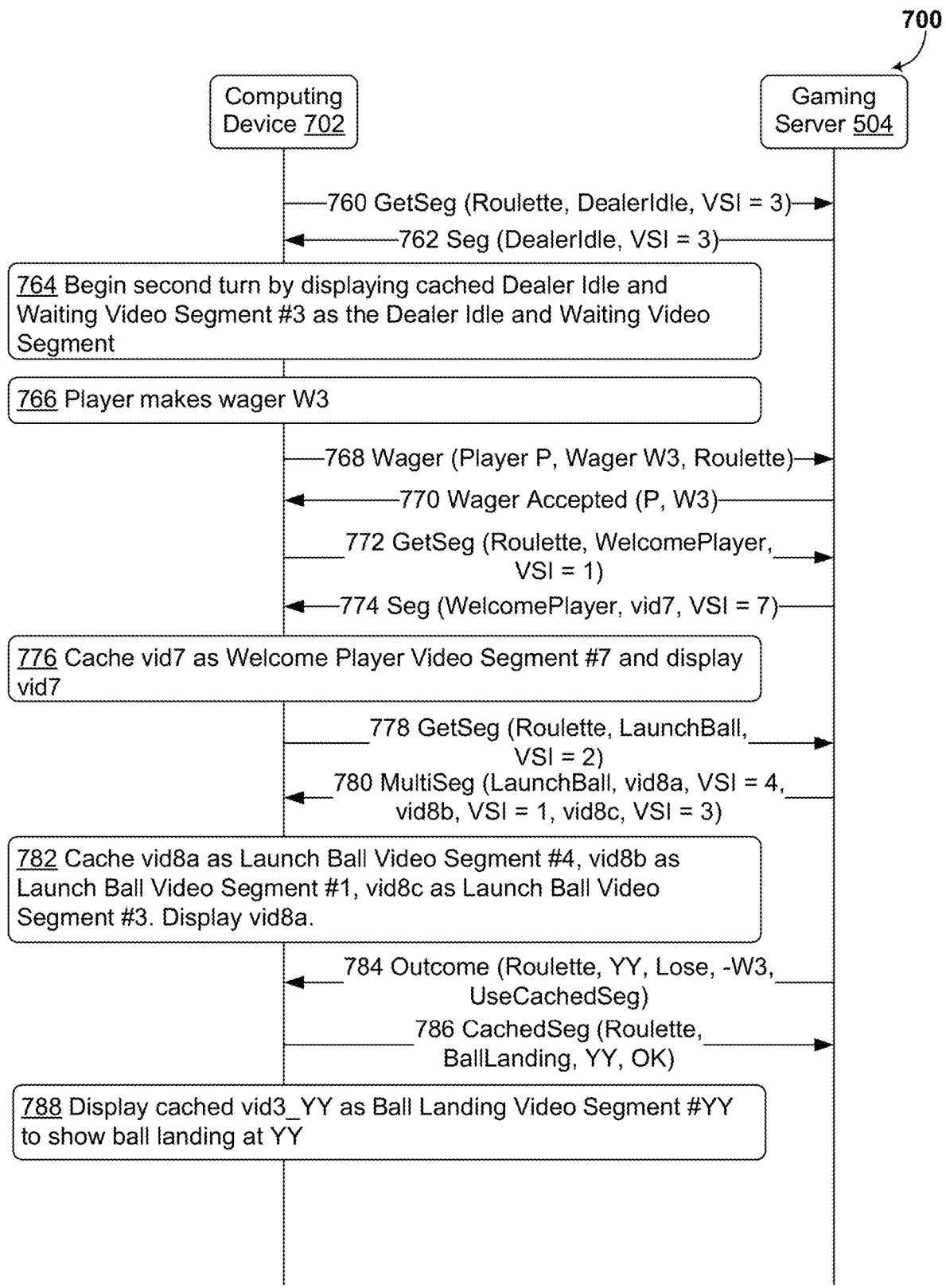

FIG. 5 illustrates scenario 500 involving a communication flow between computing device 502 and gaming server 504 related to two turns of the game of roulette, in accordance with an example embodiment. FIGS. 6A and 6B illustrate scenario 600 involving a communication flow between computing device 602 and gaming server 504 related to two turns of the game of roulette, in accordance with an example embodiment. FIGS. 7A and 7B illustrate scenario 700 involving a communication flow between computing device 702 and gaming server 504, in accordance with an example embodiment. Each of scenarios 500, 600, and 700 include two turns of the game of American roulette, which are played using a software application executing on a computing device that carries out set of functions 150 discussed above in the context of FIG. 1.

Scenarios 500, 600, and 700 differ regarding communications between computing devices and gaming server 504. The communications between gaming server 504 and the computing devices in scenarios 500, 600, and 700 can involve use of one or more computer networks, including but not limited to, the Internet. The functionality of gaming server 504 and the computing devices in scenarios 500, 600, and 700 can be carried out by computer-executable instructions executing on one or more physical computing devices, such as computing device 400. In some examples, gaming server 504 can include multiple physical computing devices.

In scenario 500, computing device 502 stores copies of all video segments used in the two turns of the game of American roulette, whereas in scenarios 600 and 700 gaming server 504 initially stores the copies of the video segments. In scenario 600, computing device 602 does not cache received copies of the video segments. In scenario 700, computing device 702 does cache received copies of the video segments.

Turning to FIG. 5, scenario 500 begins at block 510, where computing device 502 installs and stores a software application for playing American roulette. The software application is part of a software installation package that also includes a plurality of video segments to be used by the software application during roulette game play, such as discussed above in the context of set of functions 150 and FIG. 1. During installation of the software installation package, a player specifies use of the Mandarin language during game play.

At block 520, a player instructs computing device 502 to launch the roulette application. After launching the roulette application, the player can request to play a first turn of the roulette game.

At block 522, computing device 502 can, after receiving the player's request to play the first turn of the roulette game, begin to play the first turn by carrying out the procedures of block 102 of set of functions 150 by selecting and displaying a Dealer Idle and Waiting video segment. During scenario 500, computing device 502 selects Dealer Idle and Waiting video segment #3 from among a plurality of versions of the Dealer Idle and Waiting video segment provided in the plurality of video segments installed and stored at block 510. In scenario 500, computing device 502 selects Dealer Idle and Waiting video segment #3 based on a duration of the video segment and a Mandarin language of the video segment in accord with the player's language specification at block 510. In other scenarios, a Dealer Idle and Waiting video segment can be selected based on more, fewer, and/or different criteria than the duration and the language of the video segment.

At block 524, computing device 502 receives a wager of W1, W1>0, from the player; e.g., the player can utilize a user interface similar to user interface 330 to make one or more wagers on the first turn of the roulette game.

Upon receiving the wager of W1, computing device 502 generates and sends Wager message 526 to gaming server 504. FIG. 5 shows that Wager message 526 includes player identification information "P", wager amount "W1", and game information "Roulette". Upon reception of Wager message 526, gaming server 504 verifies that player P has sufficient funds to make the wager, deducts W1 from player P's account to make the requested roulette wager, generates and sends Wager Accepted message 528 to indicate that player P's wager of W1 has been accepted.

At block 530, computing device 502 can, after receiving Wager Accepted message 528, carry out the procedures of block 104 of the set of functions 150 to welcome the player by selecting and displaying a Welcome Player video segment. During scenario 500, computing device 502 selects Welcome Player video segment #1 from among a plurality of versions of the Welcome Player video segment provided in the plurality of video segments installed and stored at block 510. In scenario 500, computing device 502 selects Welcome Player video segment #1 based on a duration of the video segment and a Mandarin language of the video segment in accord with the player's language specification at block 510. In other scenarios, a Welcome Player video segment can be selected based on more, fewer, and/or different criteria than the duration and the language of the video segment.

At block 532, computing device 502 can, after displaying Welcome Player video segment #1, carry out the procedures of block 106 of the set of functions 150 to select and display a Launch Ball video segment of a roulette ball launch. During scenario 500, computing device 502 selects Launch Ball video segment #2, which does not have audio, from among a plurality of versions of the Launch Ball video segment provided in the plurality of video segments installed and stored at block 510. In scenario 500, computing device 502 selects Launch Ball video segment #2 based on a duration of the video segment. In other scenarios, a Launch Ball video segment can be selected based on more, fewer, and/or different criteria than the duration of the video segment.

In response to Wager message 526, gaming server 504 can carry out the procedures of block 108 of set of functions 150 by determining an outcome of the first turn of the roulette game e.g., randomly selecting a ball landing position. In scenario 500, gaming server 504 determines the ball lands at location XX, XX selected from {0, 00, 1, 2 . . . 36}, which leads to a win for the player. As the player's wager won, gaming server 504 increases player P's account by W2, W2>0.

After determining that the ball lands at location XX, gaming server 504 generates and sends Outcome message 534 to computing device 502 reporting that the outcome of the first turn of the "Roulette" game is "XX" and the wager made by player "P1" resulted in a "Win" of an amount of "W2".

At block 536, computing device 502 can, after receiving Outcome message 534, carry out the procedures of block 110 of the set of functions 150 to select and display a Ball Landing video segment showing a roulette ball landing. During scenario 500, computing device 502 selects Ball Landing video segment #XX from among a plurality of versions of the Ball Landing video segment provided in the plurality of video segments installed and stored at block 510. In scenario 500, computing device 502 selects Ball Landing video segment #XX based on the outcome "XX" of the roulette game. In other scenarios, a Ball Landing video segment can be selected based on more, fewer, and/or different criteria than the outcome of the roulette game.

At block 538, computing device 502 can, after displaying Ball Landing video segment #XX, carry out the procedures of block 112 of the set of functions 150 to select and display a Congratulate Player video segment to congratulate the player's win of an amount of W2. In scenario 500, computing device 502 selects Congratulate Player video segment #4 based on a duration of the video segment and a Mandarin language of the video segment in accord with the player's language specification at block 510. In other scenarios, a Congratulate Player video segment can be selected based on more, fewer, and/or different criteria than the duration and the language of the video segment.

Upon completion of block 538, scenario 500 continues with the player requesting to play a second turn of the roulette game.

At block 550, computing device 502 can, after receiving the player's request to play a turn of the roulette, begin to play the second turn of the roulette game by carrying out the procedures of block 102 of set of functions 150 to select and display a Dealer Idle and Waiting video segment. During scenario 500, computing device 502 selects Dealer Idle and Waiting video segment #3 for the second roulette turn from among a plurality of versions of the Dealer Idle and Waiting video segment provided in the plurality of video segments installed and stored at block 510. In scenario 500, computing device 502 selects Dealer Idle and Waiting video segment #3 based on a duration of the video segment and a Mandarin language of the video segment in accord with the player's language specification at block 510. In other scenarios, a Dealer Idle and Waiting video segment can be selected based on more, fewer, and/or different criteria than the duration and the language of the video segment.

At block 552, computing device 502 receives a wager of W3, W3>0, from the player for the second roulette turn; e.g., the player can utilize a user interface similar to user interface 330 to make one or more wagers on the roulette game. Upon receiving the wager of W3, computing device 502 generates and sends Wager message 554 to gaming server 504. FIG. 5 shows that Wager message 554 includes player identification information "P", wager amount "W3", and game information "Roulette". Upon reception of Wager message 554, gaming server 504 verifies that player P has sufficient funds to make the wager, deducts W3 from player P's account to make the requested roulette wager, generates and sends Wager Accepted message 556 to indicate that player P's wager of W3 has been accepted.

At block 558, computing device 502 can, after receiving Wager Accepted message 556, carry out the procedures of block 104 of the set of functions 150 to welcome the player by selecting and displaying a Welcome Player video segment. During scenario 500, computing device 502 selects Welcome Player video segment #7 for the second roulette turn from among a plurality of versions of the Dealer Idle and Waiting video segment provided in the plurality of video segments installed and stored at block 510. In scenario 500, computing device 502 selects Welcome Player video segment #7 for the second roulette turn based on a duration of the video segment and a Mandarin language of the video segment in accord with the player's language specification at block 510. In other scenarios, a Welcome Player video segment can be selected based on more, fewer, and/or different criteria than the duration and the language of the video segment.

At block 560, computing device 502 can, after displaying Welcome Player video segment #7, carry out the procedures of block 106 of the set of functions 150 to select and display a Launch Ball video segment showing a roulette ball launch for the second roulette turn. During scenario 500, computing device 502 selects Launch Ball video segment #4 for the second roulette turn from among a plurality of versions of the Launch Ball video segment provided in the plurality of video segments installed and stored at block 510. In scenario 500, computing device 502 selects Launch Ball video segment #4 for the second roulette turn based on a duration of the video segment and a Mandarin language of the video segment in accord with the player's language specification at block 510. In other scenarios, a Launch Ball video segment can be selected based on more, fewer, and/or different criteria than the duration and the language of the video segment. In particular, silent Launch Ball video segment #2 was previously selected by gaming server 504 without consideration of language-based selection criteria, while Mandarin-language Launch Ball video segment #4 was selected by gaming server 504 in accord with the player's language specification.

In response to Wager message 554, gaming server 504 can carry out the procedures of block 108 of set of functions 150 by determining an outcome of the second turn of the roulette game e.g., randomly selecting a ball landing position. In scenario 500, gaming server 504 determines that, for the second turn, the ball lands at location YY, YY selected from {0, 00, 1, 2 . . . 36}, which leads to a loss for the player. As the player lost, the procedures of block 112 are omitted for the second turn of the roulette game.

After determining that the ball lands at location YY, gaming server 504 generates and sends Outcome message 562 to computing device 502, where Outcome message 562 informs computing device that the outcome of the "Roulette" game is "YY" and the wager made by player "P1" resulted in a "Loss" of an amount of "−W3".

At block 564, computing device 502 can, after receiving Outcome message 562, carry out the procedures of block 110 of the set of functions 150 related to selecting and displaying a Ball Landing video segment showing a roulette ball landing for the second turn of roulette. During scenario 500, computing device 502 selects Ball Landing video segment #YY from among a plurality of versions of the Ball Landing video segment provided in the plurality of video segments installed and stored at block 510. In scenario 500, computing device 502 selects Ball Landing video segment #YY based on the outcome "YY" of the second turn of the roulette game. In other scenarios, a Ball Landing video segment can be selected based on more, fewer, and/or different criteria than the outcome of the roulette game. Upon completion of block 564, scenario 500 can end.

FIGS. 6A and 6B illustrate scenario 600 involving a communication flow between computing device 602 and gaming server 504 related to two turns of the game of roulette. As shown in FIG. 6A, scenario 600 begins at block 610, where computing device 602 installs and stores a software application for playing American roulette, such as discussed above in the context of set of functions 150 and FIG. 1. During installation of the software installation package, a player specifies use of the Mandarin language during game play. In scenario 600, the software application is installed without any video segments being installed at time of installation.

At block 620, a player instructs computing device 602 to launch the roulette application. After launching the roulette application, the player can request to play a first turn of the roulette game. After receiving the player's request to play the first turn of the roulette game, computing device 602 and gaming server 504 begin to play the first turn by carrying out the procedures of block 102 of set of functions 150. During scenario 600, computing device 602 generates and sends GetSeg message 622 to gaming server 504 to request a "DealerIdle" video segment for a game of "Roulette". In response, gaming server 504 selects Dealer Idle and Waiting video segment #3, which is stored in a video file called "vid1", from among a plurality of versions of the Dealer Idle and Waiting video segment. Gaming server 504 then generates and sends Seg message 624 with Dealer Idle and Waiting video segment #3/vid1 to computing device 602. In scenario 600, gaming server 504 selects Dealer Idle and Waiting video segment #3/vid1 based on a duration of the video segment and a Mandarin language of the video segment in accord with the player's language specification at block 610. In other scenarios, a Dealer Idle and Waiting video segment can be selected based on more, fewer, and/or different criteria than the duration and the language of the video segment.

At block 626, computing device 602 can receive Seg message 624 and then display vid1, which includes Dealer Idle and Waiting video segment #3, to the player.

At block 628, computing device 602 receives a wager of W1, W1>0, from the player; e.g., the player can utilize a user interface similar to user interface 330 to make one or more wagers on the first turn of the roulette game. Upon receiving the wager of W1, computing device 602 generates and sends Wager message 630 to gaming server 504. FIG. 6A shows that Wager message 630 includes player identification information "P", wager amount "W1", and game information "Roulette". Upon reception of Wager message 630, gaming server 504 verifies that player P has sufficient funds to make the wager, deducts W1 from player P's account to make the requested roulette wager, generates and sends Wager Accepted message 632 to indicate that player P's wager of W1 has been accepted.

Then, computing device 602 and gaming server 504 can carry out the procedures of block 104 of the set of functions 150 by selecting and displaying a Welcome Player video segment. After receiving Wager Accepted message 632, computing device 602 generates and sends GetSeg message 634 to gaming server 504 to request a "WelcomePlayer" video segment for a game of "Roulette". In response, gaming server 504 selects Welcome Player video segment #1, which is stored in a video file called "vid2", from among a plurality of versions of the Welcome Player video segment. Gaming server 504 then generates and sends Seg message 636 with Welcome Player video segment #1/vid2 to computing device 602. In scenario 600, gaming server 504 selects Welcome Player video segment #1/vid2 based on a duration of the video segment and a Mandarin language of the video segment in accord with the player's language specification at block 610. In other scenarios, a Welcome Player video segment can be selected based on more, fewer, and/or different criteria than the duration and the language of the video segment.

At block 638, computing device 602 can receive Seg message 636 and then display vid2, which includes Welcome Player video segment #1, to the player. After displaying Welcome Player video segment #1, computing device 602 and gaming server 504 can carry out the procedures of block 106 of the set of functions 150 to show a roulette ball launch. During scenario 600, computing device 602 generates and sends GetSeg message 640 to gaming server 504 to request a "LaunchBall" video segment for a game of "Roulette". Then, gaming server 504 selects Launch Ball video segment #2, which is stored in a video file called "vid3" and does not have audio, from among a plurality of versions of the Launch Ball video segment. Gaming server 504 then generates and sends Seg message 642 with Launch Ball video segment #2/vid3 to computing device 602. In scenario 600, gaming server 504 selects Launch Ball video segment #2 based on a duration of the video segment. In other scenarios, a Launch Ball video segment can be selected based on more, fewer, and/or different criteria than the duration of the video segment.

At block 644, computing device 602 can receive Seg message 642 and then display vid3, which includes Launch Ball video segment #2, to the player.

In response to Wager message 630, gaming server 504 can carry out the procedures of block 108 of set of functions 150 by determining an outcome of the first turn of the roulette game e.g., randomly selecting a ball landing position. In scenario 600, gaming server 504 determines the ball lands at location XX, XX selected from {0, 00, 1, 2 . . . 36}, which leads to a win for the player. As the player's wager won, gaming server 504 increases player P's account by W2, W2>0.

Also, gaming server 504 and computing device 602 can carry out the procedures of blocks 110 and 112 of the set of functions 150 respectively related to roulette ball landing and related to congratulating the player's win of an amount of W2. During scenario 600, gaming server 504 selects Ball Landing video segment #XX, which is stored in a video file called "vid4", from among a plurality of versions of the Ball Landing video segment. In scenario 600, gaming server 504 selects and displays Ball Landing video segment #XX based on the outcome "XX" of the roulette game. In other scenarios, a Ball Landing video segment can be selected based on more, fewer, and/or different criteria than the outcome of the roulette game.

Gaming server 504 also selects Congratulate Player video segment #4, which is stored in a video file called "vid5" based on a duration of the video segment and a Mandarin language of the video segment in accord with the player's language specification at block 610. In other scenarios, a Congratulate Player video segment can be selected based on more, fewer, and/or different criteria than the duration and the language of the video segment.

After determining that the ball lands at location XX and selecting Ball Landing video segment #XX/vid4 and Congratulate Player video segment #4/vid5, gaming server 504 can generate and send Outcome message 646 to computing device 602. In scenario 600, outcome message 646 informs computing device 602 that the outcome of the first turn of the "Roulette" game is "XX", the wager made by player "P1" resulted in a "Win" of an amount of "W2", that "vid4" is to be displayed as a Ball Landing video segment as part of the procedures of block 110, and "vid5" is to be displayed as a Congratulate Player video segment as part of the procedures of block 112.

At block 648, computing device 602 can receive Outcome message 646 and display vid4, which includes Ball Landing video segment #XX, to the player. At block 650, computing device 602 can display vid5, which includes Congratulate Player video segment #4, to congratulate the player on their win of an amount of W2.

Upon completion of block 650, scenario 600 continues with the player requesting to play a second turn of the roulette game. After receiving the player's request to play the second turn of the roulette game, computing device 602 and gaming server 504 begin to play the second turn by carrying out the procedures of block 102 of set of functions 150.

During scenario 600, computing device 602 generates and sends GetSeg message 660 to gaming server 504 to request a "DealerIdle" video segment for a game of "Roulette". In response, gaming server 504 selects Dealer Idle and Waiting video segment #3, which is stored in a video file called "vid6", from among a plurality of versions of the Dealer Idle and Waiting video segment. Gaming server 504 then generates and sends Seg message 662 with Dealer Idle and Waiting video segment #3/vid6 to computing device 602. In scenario 600, gaming server 504 selects Dealer Idle and Waiting video segment #3/vid6 based on a duration of the video segment and a Mandarin language of the video segment in accord with the player's language specification at block 610. In other scenarios, a Dealer Idle and Waiting video segment can be selected based on more, fewer, and/or different criteria than the duration and the language of the video segment.

At block 664, computing device 602 can receive Seg message 662 and then display vid6, which includes Dealer Idle and Waiting video segment #3, to the player.

Turning to FIG. 6B, at block 666, computing device 602 receives a wager of W3, W3>0, from the player for the second roulette turn; e.g., the player can utilize a user interface similar to user interface 330 to make one or more wagers on the second turn of the roulette game. Upon receiving the wager of W3, computing device 602 generates and sends Wager message 668 to gaming server 504, where Wager message 668 includes player identification information "P", wager amount "W3", and game information "Roulette". Upon reception of Wager message 668, gaming server 504 verifies that player P's account has sufficient funds to make the wager, deducts W3 from player P's account to make the requested roulette wager, generates and sends Wager Accepted message 670 to indicate that player P's wager of W3 has been accepted.

Then, computing device 602 and gaming server 504 can carry out the procedures of block 104 of the set of functions 150 to welcome the player by selecting and displaying a Welcome Player video segment. After receiving Wager Accepted message 670, computing device 602 generates and sends GetSeg message 672 to gaming server 504 to request a "WelcomePlayer" video segment for a game of "Roulette". In response, gaming server 504 selects Welcome Player video segment #7, which is stored in a video file called "vid7", from among a plurality of versions of the Welcome Player video segment. Gaming server 504 then generates and sends Seg message 674 with Welcome Player video segment #7/vid7 to computing device 602. In scenario 600, gaming server 504 selects Welcome Player video segment #7/vid7 based on a duration of the video segment and a Mandarin language of the video segment in accord with the player's language specification at block 610. In other scenarios, a Welcome Player video segment can be selected based on more, fewer, and/or different criteria than the duration and the language of the video segment.

At block 676, computing device 602 can receive Seg message 674 and then display vid7, which includes Welcome Player video segment #7, to the player.

After displaying Welcome Player video segment #7, computing device 602 and gaming server 504 can carry out the procedures of block 106 of the set of functions 150 to select and display a Launch Ball video segment showing a roulette ball launch for the second roulette turn. During scenario 600, computing device 602 generates and sends GetSeg message 678 to gaming server 504 to request a "LaunchBall" video segment for a game of "Roulette".

Then, gaming server 504 selects Launch Ball video segment #4 for the second roulette turn based on a duration of the video segment and a Mandarin language of the video segment in accord with the player's language specification at block 610. Gaming server 504 then generates and sends Seg message 680 with Launch Ball video segment #4/vid8 to computing device 602. In other scenarios, a Launch Ball video segment can be selected based on more, fewer, and/or different criteria than the duration and the language of the video segment. In particular, silent Launch Ball video segment #2 was previously selected by gaming server 504 without consideration of language-based selection criteria, while Mandarin-language Launch Ball video segment #4 was selected by gaming server 504 in accord with the player's language specification.

At block 682, computing device 602 can receive Seg message 680 and then display vid8, which includes Launch Ball video segment #4, to the player.

In response to Wager message 668, gaming server 504 can carry out the procedures of block 108 of set of functions 150 by determining an outcome of the second turn of the roulette game e.g., randomly selecting a ball landing position. In scenario 600, gaming server 504 determines that, for the second turn, the ball lands at location YY, YY selected from {0, 00, 1, 2 . . . 36}, which leads to a loss for the player. As the player lost, the procedures of block 112 are omitted for the second turn of the roulette game.

Also, gaming server 504 and computing device 602 can carry out the procedures of block 110 of the set of functions 150 respectively related to roulette ball landing for the second turn of the game of roulette. During scenario 600, gaming server 504 selects Ball Landing video segment #YY, which is stored in a video file called "vid9", from among a plurality of versions of the Ball Landing video segment. In scenario 600, gaming server 504 selects and displays Ball Landing video segment #YY based on the outcome "YY" of the roulette game. In other scenarios, a Ball Landing video segment can be selected based on more, fewer, and/or different criteria than the outcome of the roulette game.

After determining that the ball lands at location YY and selecting a Ball Landing video segment, gaming server 504 generates and sends Outcome message 684 to computing device 602, where Outcome message 684 informs computing device that the outcome of the "Roulette" game is "YY" and the wager made by player "P1" resulted in a "Loss" of an amount of "−W3". Outcome message 684 also includes "vid9" for carrying out the respective procedures of block 110 of the set of functions 150.

At block 686, computing device 602 can receive Outcome message 684 and display vid9, which includes Ball Landing video segment #YY, to the player. Upon completion of block 686, scenario 600 can end.

FIGS. 7A and 7B illustrate scenario 700 involving a communication flow between computing device 702 and gaming server 504. As shown in FIG. 7A, scenario 700 begins at block 710, where computing device 702 installs and stores a software application for playing American roulette, such as discussed above in the context of set of functions 150 and FIG. 1. During installation of the software installation package, a player specifies use of the Mandarin language during game play. In scenario 700, the software application is installed without any video segments being installed at time of installation, but the software application is enable to cache all received video segments.

At block 720, a player instructs computing device 702 to launch the roulette application. After launching the roulette application, the player can request to play a first turn of the roulette game. After receiving the player's request to play the first turn of the roulette game, computing device 702 and gaming server 704 begin to play the first turn by carrying out the procedures of block 102 of set of functions 150. During scenario 700, computing device 702 generates and sends GetSeg message 722 to gaming server 504 to request a "DealerIdle" video segment for a game of "Roulette". In response, gaming server 504 selects Dealer Idle and Waiting video segment #3, which is stored in a video file called "vid1", from among a plurality of versions of the Dealer Idle and Waiting video segment. Gaming server 504 selects Dealer Idle and Waiting video segment #3/vid1 based on a duration of the video segment and a Mandarin language of the video segment in accord with the player's language specification at block 610. In other scenarios, a Dealer Idle and Waiting video segment can be selected based on more, fewer, and/or different criteria than the duration and the language of the video segment.

Gaming server 504 then generates and sends Seg message 724 with Dealer Idle and Waiting video segment #3/vid1 to computing device 702. Seg message 724 includes three data items: an indicator that the video segment is a "DealerIdle" video segment, the "vid1" video segment, and a video segment identifier (VSI) "VSI=3" to indicate that vid1 can be identified to gaming server 504 as a copy of the Dealer Idle and Waiting video segment #3.

At block 726, computing device 702 can receive Seg message 724, cache vid1 as Dealer Idle and Waiting video segment #3 based on the video segment indicator in Seg message 724, and display vid1 to the player. In other scenarios, computing device 702 can send one or more messages to gaming server 504 to indicate that one or more video segments were not actually cached; e.g., Dealer Idle and Waiting video segment #3.

At block 728, computing device 702 receives a wager of W, W1>0, from the player; e.g., the player can utilize a user interface similar to user interface 330 to make one or more wagers on the first turn of the roulette game. Upon receiving the wager of W1, computing device 702 generates and sends Wager message 730 to gaming server 504. FIG. 7A shows that Wager message 730 includes player identification information "P", wager amount "W1", and game information "Roulette". Upon reception of Wager message 730, gaming server 504 verifies that player P has sufficient funds to make the wager, deducts W1 from player P's account to make the requested roulette wager, generates and sends Wager Accepted message 732 to indicate that player P's wager of W1 has been accepted.

Then, computing device 702 and gaming server 504 can carry out the procedures of block 104 of the set of functions 150 to welcome the player by selecting and displaying a Welcome Player video segment. After receiving Wager Accepted message 732, computing device 702 generates and sends GetSeg message 734 to gaming server 504 to request a "WelcomePlayer" video segment for a game of "Roulette". In response, gaming server 504 selects Welcome Player video segment #1, which is stored in a video file called "vid2", from among a plurality of versions of the Welcome Player video segment. In scenario 700, gaming server 504 selects Welcome Player video segment #1/vid2 based on a duration of the video segment and a Mandarin language of the video segment in accord with the player's language specification at block 710. In other scenarios, a Welcome Player video segment can be selected based on more, fewer, and/or different criteria than the duration and the language of the video segment.

Gaming server 504 then generates and sends Seg message 736 with Welcome Player video segment #1/vid2 to computing device 702. Seg message 736 includes three data items: an indicator that the video segment is a "Welcome-Player" video segment, the "vid2" video segment, and video segment identifier "VSI=1" to indicate that vid2 is identified as a copy of the Welcome Player video segment #1 by gaming server 504.

At block 738, computing device 702 can receive Seg message 736, cache vid2 as Welcome Player video segment #1, and display vid2 to the player.

After displaying Welcome Player video segment #1, computing device 702 and gaming server 504 can carry out the procedures of block 106 of the set of functions 150 to show a roulette ball launch. During scenario 700, computing device 702 generates and sends GetSeg message 740 to gaming server 504 to request a "LaunchBall" video segment for a game of "Roulette". Then, gaming server 504 selects Launch Ball video segment #2, which is stored in a video file called "vid3" and does not have audio, from among a plurality of versions of the Launch Ball video segment. In scenario 700, gaming server 504 selects Launch Ball video segment #2 based on a duration of the video segment. In other scenarios, a Launch Ball video segment can be selected based on more, fewer, and/or different criteria than the duration of the video segment.

Gaming server 504 then generates and sends Seg message 742 with Launch Ball video segment #2/vid3 to computing device 702. Seg message 742 includes three data items: an indicator that the video segment is a "LaunchBall" video segment, the "vid3" video segment, and video segment identifier "VSI=2" to indicate that vid3 is identified as a copy of the Launch Ball video segment #2 by gaming server 504.

At block 744, computing device 702 can receive Seg message 742, cache vid3 as Launch Ball video segment #2, and display vid3 to the player.

In response to Wager message 730, gaming server 504 can carry out the procedures of block 108 of set of functions 150 by determining an outcome of the first turn of the roulette game e.g., randomly selecting a ball landing position. In scenario 700, gaming server 504 determines the ball lands at location XX, XX selected from {0, 00, 1, 2 . . . 36}, which leads to a win for the player. As the player's wager won, gaming server 504 increases player P's account by W2, W2>0.

Also, gaming server 504 and computing device 702 can carry out the procedures of blocks 110 and 112 of the set of functions 150 respectively related to roulette ball landing and related to congratulating the player's win of an amount of W2. During scenario 700, gaming server 504 selects Ball Landing video segment #XX, which is stored in a video file called "vid4", from among a plurality of versions of the Ball Landing video segment. In scenario 700, gaming server 504 selects and displays Ball Landing video segment #XX based on the outcome "XX" of the roulette game. In other scenarios, a Ball Landing video segment can be selected based on more, fewer, and/or different criteria than the outcome of the roulette game.

Gaming server 504 also selects Congratulate Player video segment #4, which is stored in a video file called "vid5" based on a duration of the video segment and a Mandarin language of the video segment in accord with the player's language specification at block 710. In other scenarios, a Congratulate Player video segment can be selected based on more, fewer, and/or different criteria than the duration and the language of the video segment.

After determining that the ball lands at location XX and selecting Ball Landing and Congratulate Player video segments, gaming server 504 generates and sends Outcome message 746 to computing device 702, where Outcome message 746 informs computing device 702 that the outcome of the first turn of the "Roulette" game is "XX" and that the wager made by player "P1" resulted in a "Win" of an amount of "W2". Outcome message 746 also includes "vid4" as a Ball Landing video segment during the procedures of block 110 and "vid5" having video segment identifier "VSI=4" is a Congratulate Player video segment during the procedures of block 112.

At block 748, computing device 702 can receive Outcome message 746. Upon reception of Outcome message 746, computing device 702 displays vid4 to the player, which includes Ball Landing video segment #XX, to show the ball landing at XX. Computing device 702 also caches vid5 as Congratulate Player video segment #4 and displays vid5 to the player for congratulating the player's win of an amount of W2.

Scenario 700 continues with gaming server 504 generating and sending MultiSeg message 750 to computing device 702. MultiSeg message 750 can be used to send multiple video segments for caching by computing device 702. In particular, FIG. 7A shows that MultiSeg message 750 includes "38" total "BallLanding" video segments, with the first Ball Landing video segment "vid_0" having a video segment identifier of "0", the second Ball Landing video segment "vid_00" having a video segment identifier of "00", and so on until reaching the 38$^{th}$ Ball Landing video segment "vid_36" having a video segment identifier of "36". In other scenarios, computing device 702 can send one or more messages to gaming server 504 to indicate whether or not one or more video segments provided in a MultiSeg message were actually cached.

At block 752, upon reception of MultiSeg message 750, computing device caches the 38 received BallLanding video segments as respective BallLanding video segments #0, #00, 1, 2 . . . #36.

Upon completion of block 752, scenario 700 continues with the player requesting to play a second turn of the roulette game. After receiving the player's request to play the second turn of the roulette game, computing device 702 and gaming server 504 begin to play the second turn by carrying out the procedures of block 102 of set of functions 150.

Turning to FIG. 7B, computing device 702 sends a GetSeg message 760 to gaming server 504 to request a "DealerIdle" video segment for the game of "Roulette" and to inform gaming server 504 that computing device 702 has cached DealerIdle segment #3 using the "VSI=3" portion of GetSegMessage 760. In response, gaming server 504 selects DealerIdle segment #3 for use in the second turn of the game of roulette. In scenario 700, gaming server 504 selects Dealer Idle and Waiting video segment #3/vid6 based on a duration of the video segment and a Mandarin language of the video segment in accord with the player's language specification at block 710. In other scenarios, a Dealer Idle and Waiting video segment can be selected based on more, fewer, and/or different criteria than the duration and the language of the video segment.

Gaming server 504 then sends Seg message 762 to instruct computing device 702 to display the cached DealerIdle segment having the video segment identifier of 3. Note that Seg message 762 does not include a copy of the video segment.

At block 764, after receiving Seg message 762, computing device 702 can display the cached DealerIdle segment #3 as Dealer Idle and Waiting Video Segment for the second turn of the game of roulette. By displaying the already-cached copy of Dealer Idle and Waiting Video Segment #3, game play can be sped up and network bandwidth conserved in comparison to sending DealerIdle segment #3 during the second turn of the game of roulette as performed at block 664 of scenario 600.

At block 766, computing device 702 can receive a wager of W3, W3>0, from the player for the second roulette turn; e.g., the player can utilize a user interface similar to user interface 330 to make one or more wagers on the second turn of the roulette game. Upon receiving the wager of W3, computing device 702 generates and sends Wager message 768 to gaming server 504. FIG. 7B shows that Wager message 768 includes player identification information "P", wager amount "W3", and game information "Roulette". Upon reception of Wager message 768, gaming server 504 verifies that player P's account has sufficient funds to make the wager, deducts W3 from player P's account to make the requested roulette wager, generates and sends Wager Accepted message 770 to indicate that player P's wager of W3 has been accepted.

Then, computing device 702 and gaming server 504 can carry out the procedures of block 104 of the set of functions 150 to welcome the player by selecting and displaying a Welcome Player video segment. After receiving Wager Accepted message 770, computing device 702 generates and sends GetSeg message 772 to gaming server 504 to request a "WelcomePlayer" video segment for a game of "Roulette" and uses the "VSI=1" data item to inform gaming server 504 that computing device 702 has cached Welcome Player video segment #1.

In response, gaming server 504 selects Welcome Player video segment #7, which is stored in a video file called "vid7", from among a plurality of versions of the Welcome Player video segment. In scenario 700, gaming server 504 selects Welcome Player video segment #7/vid7 based on a duration of the video segment and a Mandarin language of the video segment in accord with the player's language specification at block 710. In other scenarios, a Welcome Player video segment can be selected based on more, fewer, and/or different criteria than the duration and the language of the video segment.

Gaming server 504 generates and sends Seg message 774 with Welcome Player video segment #7/vid7 to computing device 702. Seg message 774 includes three data items: an indicator that the video segment is a "WelcomePlayer" video segment, the "vid7" video segment, and a video segment identifier "VSI=7" to indicate that vid7 can be identified to gaming server 504 as a copy of the Welcome Player video segment #7.

At block 776, computing device 702 can receive Seg message 774, cache vid7 as Welcome Player video segment #7 based on the video segment indicator in Seg message 774, and display vid7 to the player.

After displaying Welcome Player video segment #7, computing device 702 and gaming server 504 can carry out the procedures of block 106 of the set of functions 150 to select and display a Launch Ball video segment showing a roulette ball launch for the second roulette turn. During scenario 700, computing device 702 generates and sends GetSeg message 778 to gaming server 504 to request a "LaunchBall" video segment for a game of "Roulette" and uses the "VSI=2" data item to inform gaming server 504 that computing device 702 has cached Launch Ball video segment #2.

Then, gaming server 504 selects Launch Ball video segment #4 for the second roulette turn based on a duration of the video segment and a Mandarin language of the video segment in accord with the player's language specification at block 710. In other scenarios, a Launch Ball video segment can be selected based on more, fewer, and/or different criteria than the duration and the language of the video segment. In particular, silent Launch Ball video segment #2 was previously selected by gaming server 504 without consideration of language-based selection criteria, while Mandarin-language Launch Ball video segment #4 was selected by gaming server 504 in accord with the player's language specification.

In scenario 700, gaming server 504 has a total of four versions of the Launch ball video segment. Gaming server 504 determines to request that computing device 702 cache all four versions. To that end, gaming server 504 then generates and sends MultiSeg message 780 with a copy of Launch Ball video segment #4 stored in "vid8a" and identified as "VSI=4". MultiSeg message 780 also includes a copy of Launch Ball video segment #1 stored in "vid8b" and identified as "VSI=1" and a copy of Launch Ball video segment #3 stored in "vid8c" and identified as "VSI=3".

At block 782, computing device 702 can receive Seg message 780, cache vid8a as Launch Ball video segment #4, cache vid8b as Launch Ball video segment #1, cache vid8c as Launch Ball video segment #3, and then display vid8a to the player.

In response to Wager message 768, gaming server 504 can carry out the procedures of block 108 of set of functions 150 by determining an outcome of the second turn of the roulette game e.g., randomly selecting a ball landing position. In scenario 700, gaming server 504 determines that, for the second turn, the ball lands at location YY, YY selected from {0, 00, 1, 2 . . . 36}, which leads to a loss for the player. As the player lost, the procedures of block 112 are omitted for the second turn of the roulette game.

Also, gaming server 504 and computing device 702 can carry out the procedures of block 110 of the set of functions 150 respectively related to roulette ball landing for the second turn of the game of roulette. During scenario 700, gaming server 504 selects Ball Landing video segment #YY from among a plurality of versions of the Ball Landing video segment. In scenario 700, gaming server 504 selects and displays Ball Landing video segment #YY based on the outcome "YY" of the roulette game. In other scenarios, a Ball Landing video segment can be selected based on more, fewer, and/or different criteria than the outcome of the roulette game.

In scenario 700, gaming server 504 recalls that computing device 702 has already cached 38 Ball Outcome video segments while processing MultiSeg message 750. After determining that the ball lands at location YY and selecting a Ball Landing video segment, gaming server 504 generates and sends Outcome message 784 to computing device 702, where Outcome message 784 informs computing device that the outcome of the "Roulette" game is "YY" and the wager made by player "P1" resulted in a "Loss" of an amount of "−W3". Outcome message 784 also includes an indicator "UseCachedSeg" for carrying out the respective procedures of block 110 of the set of functions 150 using the already-cached Ball Landing video segment associated with location YY.

In response to Outcome message 784, computing device 702 can verify that it has a cached copy of a Ball Landing video segment associated with location/video segment identifier YY and send CachedSeg message 786 to inform gaming server 504 that the request to computing device 702 to use a cached "BallLanding" video segment associated with location/video segment identifier "YY" for the game of "Roulette" is "OK". That is, CachedSeg message 786 informs gaming server 504 that computing device 702 does have, and so will use, an already-cached Ball Landing video segment associated with location YY.

In other scenarios, computing device 702 can omit sending CachedSeg message 786 to save bandwidth. In some of these other scenarios, computing device 702 can send one or more CachedSeg and/or similar messages when a video presumed to be cached by gaming server 504 is not cached and/or is otherwise unavailable to computing device 702.

At block 788, computing device 702 can retrieve and then display the cached version Ball Landing video segment associated with location YY to the player. Upon completion of block 788, scenario 700 can end.

V. Example Operation

Figure 8:
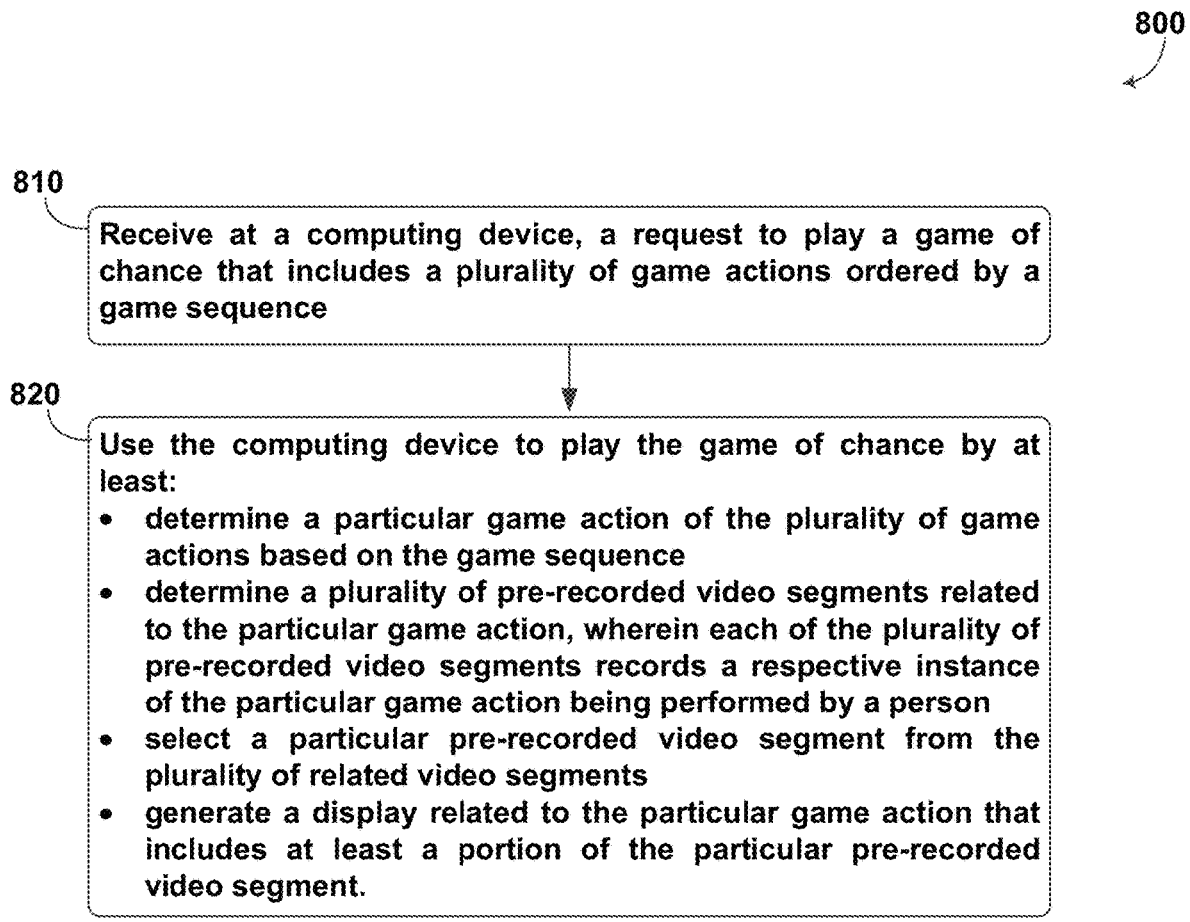
FIG. 8 is a flow chart of functions to carry out a method, in accordance with an example embodiment.

FIG. 8 is a flow chart of functions to carry out method 800, in accordance with an example embodiment. The functions are shown within blocks 810 to 820. The functions of method 800 can be carried out by a computing device, such as computing device 400 described above in the context of at least FIGS. 4-7B.

FIG. 10 indicates that method 800 can begin at block 810. At block 810, the computing device can receive a request to play a game of chance that includes a plurality of game actions ordered by a game sequence, such as discussed above at least in the context of FIGS. 1, 2, 3A, 3B, and 3C.

At block 820, the computing device can be used to play the game of chance by at least: determining a particular game action of the plurality of game actions based on the game sequence; determining a plurality of pre-recorded video segments related to the particular game action, where each of the plurality of pre-recorded video segments records a respective instance of the particular game action being performed by a person; selecting a particular pre-recorded video segment from the plurality of pre-recorded video segments; and generating a display related to the particular game action that includes at least a portion of the particular pre-recorded video segment, such as discussed above at least in the context of FIGS. 1, 2, 3A, 3B, and 3C.

In some embodiments, the person can be at least one of: a dealer and a croupier.

In other embodiments, the game of chance can be one of: roulette, blackjack, and baccarat, such as discussed above at least in the context of FIGS. 1, 2, 3A, 3B, and 3C. In particular of these embodiments, the game of chance can be roulette; then, the particular game action can be one of: a making wagers game action, a ball launch game action, a ball landing game action, and a settling wagers game action, such as discussed above at least in the context of FIG. 1. In other particular of these embodiments, the game of chance can be blackjack; then, the particular game action can be one of: a making wagers game action, a player hand game action, a dealer hand game action, and a settling wagers game action, such as discussed above at least in the context of FIG. 2.

In still other embodiments, using the computing device to play the game of chance can further include: determining a second particular game action of the plurality of game actions that follows the particular game action according to the game sequence; determining a second plurality of pre-recorded video segments related to the second particular game action, where each of the second plurality of pre-recorded video segments records a respective instance of the second particular game action being performed by a person; selecting a second particular pre-recorded video segment from the second plurality of pre-recorded video segments; and generating a second display related to the second particular game action that includes at least a portion of the second particular pre-recorded video segment, such as discussed above in the context of at least FIGS. 1, 2, 3A, 3B, and 3C.

In even other embodiments, generating the display related to the particular game action can include generating a display that includes the at least a portion of the particular pre-recorded video segment and a three-dimensional graphical object, such as discussed above in the context of at least FIGS. 2, 3A, 3B, and 3C. In particular of these embodiments, the game of chance utilizes playing cards; then, the three-dimensional graphical object can represent at least one playing card, such as discussed above in the context of at least FIGS. 2, 3A, 3B, and 3C.

In yet other embodiments, the plurality of pre-recorded video segments can include a plurality of video segments that have a plurality of different durations; then, selecting the particular pre-recorded video segment can include selecting the particular pre-recorded video segment based on a duration of the video segment, such as discussed above in the context of at least FIG. 4.

In further other embodiments, the plurality of pre-recorded video segments can include a plurality of video segments utilizing a plurality of different languages; then, selecting the particular pre-recorded video segment can include selecting the particular pre-recorded video segment based on a language of the video segment, such as discussed above in the context of at least FIG. 4.

In even further other embodiments, the game of chance can have a plurality of outcomes, the particular game action can be associated with a particular outcome of the plurality of outcomes, and the plurality of pre-recorded video segments include a plurality of outcome video segments associated with the plurality of outcomes, such as discussed above in the context of at least FIGS. 1 and 4. In particular of these embodiments, selecting the particular pre-recorded video segment includes selecting an outcome video segment associated with the particular outcome from the plurality of outcome video segments, such as discussed above in the context of at least FIGS. 1 and 4.

In still further other embodiments, using the computing device to play the game of chance can include executing the software application stored on the computing device to play the game of chance, such as discussed above in the context of at least FIGS. 4, 5, 6A, 7A, and 7B. In particular of these embodiments, the computing device can be configured to store at least the software application and the plurality of pre-recorded video segments, such as discussed above in the context of at least FIGS. 4, 5, 7A, and 7B. In particular of these embodiments, method 800 can further include: receiving, at the computing device, a software application package that includes the software application and the plurality of pre-recorded video segments; and storing the software application and the plurality of pre-recorded video segments using the computing device, such as discussed above in the context of at least FIG. 5.

In yet further other embodiments, selecting the particular pre-recorded video segment from the plurality of pre-recorded video segments can include: receiving the particular pre-recorded video segment at the computing device; and storing the particular pre-recorded video segment in data storage of the computing device, such as discussed above in the context of at least FIGS. 7A and 7B. In particular of these embodiments, method 800 can further include: using the computing device to play the game of chance a second time by at least: determining a particular game action of the plurality of game actions based on the game sequence; determining the plurality of pre-recorded video segments related to the particular game action; and selecting the particular pre-recorded video segment from the plurality of pre-recorded video segments by at least: retrieving the particular pre-recorded video segment from the data storage of the computing device, such as discussed above in the context of at least FIGS. 7A and 7B. In other particular of these embodiments, receiving the particular pre-recorded video segment at the computing device includes receiving the plurality of pre-recorded video segments, such as discussed above in the context of at least FIGS. 7A and 7B.

VI. Additional Example Embodiments

The following clauses are offered as further description of the disclosure.

Clause 1—A method, including: receiving, at a computing device, a request to play a game of chance that includes a plurality of game actions ordered by a game sequence; and using the computing device to play the game of chance by at least: determining a particular game action of the plurality of game actions based on the game sequence; determining a plurality of pre-recorded video segments related to the particular game action, where each of the plurality of pre-recorded video segments records a respective instance of the particular game action being performed by a person; selecting a particular pre-recorded video segment from the plurality of pre-recorded video segments; and generating a display related to the particular game action that includes at least a portion of the particular pre-recorded video segment.

Clause 2—The method of Clause 1, where using the computing device to play the game of chance further includes: determining a second particular game action of the plurality of game actions that follows the particular game action according to the game sequence; determining a second plurality of pre-recorded video segments related to the second particular game action, where each of the second plurality of pre-recorded video segments records a respective instance of the second particular game action being performed by a person; selecting a second particular pre-recorded video segment from the second plurality of pre-recorded video segments; and generating a second display related to the second particular game action that includes at least a portion of the second particular pre-recorded video segment.

Clause 3—The method of either Clause 1 or Clause 2, where the person includes at least one of: a dealer and a croupier.

Clause 4—The method of any one of Clauses 1-3, where the game of chance is one of: roulette, blackjack, and baccarat.

Clause 5—The method of Clause 4, where the game of chance is roulette, and where the particular game action is one of: a making wagers game action, a ball launch game action, a ball landing game action, and a settling wagers game action.

Clause 6—The method of Clause 4, where the game of chance is blackjack, and where the particular game action is one of: a making wagers game action, a player hand game action, a dealer hand game action, and a settling wagers game action.

Clause 7—The method of any one of Clauses 1-6, where generating the display related to the particular game action includes generating a display that includes the at least a portion of the particular pre-recorded video segment and a three-dimensional graphical object.

Clause 8—The method of Clause 7, where the game of chance utilizes playing cards, and where the three-dimensional graphical object represents at least one playing card.

Clause 9—The method of any one of Clauses 1-8, where the plurality of pre-recorded video segments include a plurality of video segments that have a plurality of different durations, and where selecting the particular pre-recorded video segment includes selecting the particular pre-recorded video segment based on a duration of the video segment.

Clause 10—The method of any one of Clauses 1-9, where the plurality of pre-recorded video segments include a plurality of video segments utilizing a plurality of different languages, and where selecting the particular pre-recorded video segment includes selecting the particular pre-recorded video segment based on a language of the video segment.

Clause 11—The method of any one of Clauses 1-10, where the game of chance has a plurality of outcomes, where the particular game action is associated with a particular outcome of the plurality of outcomes, and where the plurality of pre-recorded video segments include a plurality of outcome video segments associated with the plurality of outcomes.

Clause 12—The method of Clause 11, where selecting the particular pre-recorded video segment includes selecting an outcome video segment associated with the particular outcome from the plurality of outcome video segments.

Clause 13—The method of any one of Clauses 1-12, where using the computing device to play the game of chance includes executing a software application stored on the computing device to play the game of chance.

Clause 14—The method of Clause 13, where the computing device is configured to store at least the software application and the plurality of pre-recorded video segments.

Clause 15—The method of Clause 14, further including: receiving, at the computing device, a software application package that includes the software application and the plurality of pre-recorded video segments; and storing the software application and the plurality of pre-recorded video segments using the computing device, where receiving the request to play the game of chance includes receiving the request to play the game of chance using the software application.

Clause 16—The method of any one of Clauses 1-15, where selecting the particular pre-recorded video segment from the plurality of pre-recorded video segments includes: receiving the particular pre-recorded video segment at the computing device; and storing the particular pre-recorded video segment in data storage of the computing device.

Clause 17—The method of Clause 16, further including: using the computing device to play the game of chance a second time by at least: determining a particular game action of the plurality of game actions based on the game sequence; determining the plurality of pre-recorded video segments related to the particular game action; and selecting the particular pre-recorded video segment from the plurality of pre-recorded video segments by at least: retrieving the particular pre-recorded video segment from the data storage of the computing device.

Clause 18—The method of Clause 16 or Clause 17, where receiving the particular pre-recorded video segment at the computing device includes receiving the plurality of pre-recorded video segments.

Clause 19—A computing device, including: one or more processors; and data storage configured to store at least computer-readable program instructions that, when executed by the one or more processors, cause the computing device to carry out functions including the method of any one of Clauses 1-18.

Clause 20—The computing device of Clause 19, where the data storage includes a non-transitory computer-readable medium.

Clause 21—A computer-readable medium configured to store instructions that, when executed by one or more processors of a computing device, cause the computing device to carry out functions including the method of any one of Clauses 1-18.

Clause 22—The computer-readable medium of Clause 21, where the computer-readable medium includes a non-transitory computer-readable medium.

VII. Conclusion

Example embodiments have been described above. Those skilled in the art will understand that changes and modifications can be made to the described embodiments without departing from the true scope of the described embodiments as claimed.

This detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be used, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including in substantially concurrent or in reverse order, depending on the functionality involved. Further, more or fewer steps, blocks and/or functions can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer-readable medium such as a storage device including a disk or hard drive or other storage media.

The computer-readable medium can include non-transitory computer-readable media such as computer-readable media that stores data for short periods of time like register memory, processor cache, and/or random access memory (RAM). The computer-readable media can include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media can be any other volatile or non-volatile storage systems. A computer-readable medium can be considered a computer-readable storage medium, for example, or a tangible storage device.

Software for use in carrying out the herein-described embodiments can also be in transitory form, for example in the form of signals transmitted over a network such as the Internet. Moreover, a step or block that represents one or more information transmissions can correspond to information transmissions between software and/or hardware modules in the same physical device. However, other information transmissions can be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting.

We claim:

1. A method comprising:
    executing, via a computing device, a software application comprising instructions to play a blackjack game comprising a plurality of game actions ordered by a game sequence;
    receiving, via the software application, a request to play the blackjack game; and
    during a play of the blackjack game, generating, in a user interface of the software application, a sequence of pre-recorded video segments, wherein the pre-recorded video segments depict a human dealer performing the game actions, and wherein generating the sequence of pre-recorded video segments comprises:
        determining a first game action of the plurality of game actions based on the game sequence;
        selecting a first pre-recorded video segment from a plurality of pre-recorded video segments corresponding to the first game action;
        generating, in the user interface of the software application, a first display related to the first game action, the first display comprising at least a portion of the first pre-recorded video segment of the sequence of pre-recorded video segments, wherein the first pre-recorded video segment depicts the first game action being performed by the human dealer;
        determining a second game action of the plurality of game actions based on the game sequence; and
        generating, in the user interface of the software application, a second display related to the second game action, the second display comprising (i) at least a portion of a second pre-recorded video segment of the sequence of pre-recorded video segments and (ii) two or more objects representing respective playing cards, the two or more objects at least partially overlaying the second pre-recorded video segment, wherein the second pre-recorded video segment depicts the second game action being performed by the human dealer.

2. The method of claim 1, wherein generating the second display comprises superimposing the two or more objects at least partially over the second pre-recorded video segment on the second display.

3. The method of claim 2, wherein generating the second display comprises moving the two or more objects to indicate three-dimensionality of the two or more objects.

4. The method of claim 3, wherein moving the two or more objects to indicate three-dimensionality of the two or more objects comprises turning at least one of the two or more objects to reveal faces of the respective playing cards.

5. The method of claim 3, wherein the second game action comprises a deal, wherein the second pre-recorded video segment depicts the human dealer performing the deal, and wherein superimposing the two or more objects at least partially over the second pre-recorded video segment comprising superimposing the two or more objects over one or more particular portions of the second pre-recorded video segment to simulate the human dealer depicted in the second pre-recorded video segment dealing the two or more objects representing respective playing cards.

6. The method of claim 3, wherein the second game action is at least one of: a player hand game action or a dealer hand game action.

7. The method of claim 1, wherein the first game action is a player hand game action, and wherein the plurality of pre-recorded video segments depicting the first game action comprises two or more pre-recorded video segments depicting the human dealer idle and waiting.

8. The method of claim 1, wherein
    before the play of the blackjack game, selecting, from among multiple sets of pre-recorded video segments, a particular set of pre-recorded videos segments for the play based on one or more user selections.

9. The method of claim 8, wherein the one or more user selections comprise a selection of a particular language, wherein the particular set of pre-recorded videos segments depict the human dealer speaking in the particular language, and wherein selecting the particular set of pre-recorded videos segments for the play comprises selecting the particular set of pre-recorded videos segments based on the selection of the particular language.

10. The method of claim 8, wherein the one or more user selections comprise a selection of a particular human dealer, wherein the particular set of pre-recorded videos segments depict the particular human dealer, and wherein selecting the particular set of pre-recorded videos segments for the play comprises selecting the particular set of pre-recorded videos segments based on the selection of the particular human dealer.

11. The method of claim 8, wherein the multiple sets of pre-recorded video segments comprise respective video segments depicting (a) a "dealer waits for bets" video segment, (b) a "dealer deals cards" video segment, (c) a "dealer awaits player input" video segment, (d) a "player hits" video segment, and (e) a "player stands" video segment.

12. The method of claim 1, wherein the human dealer is a first human dealer, wherein the plurality of pre-recorded video segments corresponding to the first game action comprises one or more pre-recorded video segments depicting one or more second human dealers performing the first game action, and wherein selecting the first pre-recorded video segment comprises:
  selecting the first pre-recorded video segment from the plurality of pre-recorded video segments based on the first pre-recorded video segment depicting the first human dealer performing the first game action.

13. The method of claim 12, further comprising:
  selecting the second pre-recorded video segment from a plurality of pre-recorded video segments depicting the second game action based on the second pre-recorded video segment depicting the first human dealer performing the first game action.

14. The method of claim 1, wherein the plurality of pre-recorded video segments corresponding to the first game action comprise multiple video segments that have a plurality of different durations, and wherein selecting the first pre-recorded video segment comprises selecting the first pre-recorded video segment from the plurality of pre-recorded video segments based on a particular duration of the first pre-recorded video segment.

15. The method of claim 1, wherein the human dealer is a first human dealer, and wherein the method further comprises:
  receiving, via the software application, another request to play the blackjack game; and
  during a second play of the blackjack game, generating, in the user interface of the software application, a second sequence of pre-recorded video segments, wherein the pre-recorded video segments depict a second human dealer performing the game actions, and wherein generating the second sequence of pre-recorded video segments comprises:
    determining a first game action of the plurality of game actions based on the game sequence;
    selecting a first pre-recorded video segment from a plurality of pre-recorded video segments corresponding to the first game action;
    generating, in the user interface of the software application, a first display related to the first game action, the first display comprising at least a portion of the first pre-recorded video segment of the sequence of pre-recorded video segments, wherein the first pre-recorded video segment depicts the first game action being performed by the second human dealer;
    determining a second game action of the plurality of game actions based on the game sequence; and
    generating, in the user interface of the software application, a second display related to the second game action, the second display comprising (i) at least a portion of a second pre-recorded video segment of the sequence of pre-recorded video segments and (ii) two or more objects representing respective playing cards, the two or more objects at least partially overlaying the second pre-recorded video segment, wherein the second pre-recorded video segment depicts the second game action being performed by the second human dealer.

16. The method of claim 1, wherein the blackjack game has a plurality of outcomes, and wherein the method further comprises:
  determining a third game action of the plurality of game actions based on the game sequence, wherein the third game action corresponds to a particular outcome of the play of the blackjack game;
  based on the particular outcome of the play of the blackjack game, selecting a third pre-recorded video segment from a plurality of outcome video segments associated with the plurality of outcomes; and
  generating, in the user interface of the software application, a third display related to the third game action, the third display comprising (i) at least a portion of the third pre-recorded video segment of the sequence of pre-recorded video segments, wherein the third pre-recorded video segment depicts the human dealer reacting to the particular outcome.

17. The method of claim 16, further comprising:
  receiving, via a network interface from a gaming server, data representing the particular outcome, wherein selecting the third pre-recorded video segment from the plurality of outcome video segments associated with the plurality of outcomes comprises selecting the third pre-recorded video segment based on the received data representing the particular outcome.

18. The method of claim 1, wherein selecting the first pre-recorded video segment from the plurality of pre-recorded video segments corresponding to the first game action comprises:
  receiving data representing the pre-recorded video segments at the computing device; and
  storing the first pre-recorded video segment in data storage of the computing device.

19. A non-transitory computer readable medium configured to store instructions that, when executed by one or more processors of a computing device, cause the computing device to carry out functions comprising:
  executing, via the computing device, a software application comprising instructions to play a blackjack game comprising a plurality of game actions ordered by a game sequence;
  receiving, via the software application, a request to play the blackjack game; and
  during a play of the blackjack game, generating, in a user interface of the software application, a sequence of pre-recorded video segments, wherein the pre-recorded video segments depict a human dealer performing the game actions, and wherein generating the sequence of pre-recorded video segments comprises:
    determining a first game action of the plurality of game actions based on the game sequence;
    selecting a first pre-recorded video segment from a plurality of pre-recorded video segments corresponding to the first game action;
    generating, in the user interface of the software application, a first display related to the first game action, the first display comprising at least a portion of the first pre-recorded video segment of the sequence of pre-recorded video segments, wherein the first pre-recorded video segment depicts the first game action being performed by the human dealer;
    determining a second game action of the plurality of game actions based on the game sequence; and
    generating, in the user interface of the software application, a second display related to the second game action, the second display comprising (i) at least a portion of a second pre-recorded video segment of the sequence of pre-recorded video segments and (ii) two or more objects representing respective playing cards, the two or more objects at least partially overlaying the second pre-recorded video segment, wherein the second pre-recorded video segment depicts the second game action being performed by the human dealer.

20. A computing device comprising:

executing, via the computing device, a software application comprising instructions to play a blackjack game comprising a plurality of game actions ordered by a game sequence;

receiving, via the software application, a request to play the blackjack game; and during a play of the blackjack game, generating, in a user interface of the software application, a sequence of pre-recorded video segments, wherein the pre-recorded video segments depict a human dealer performing the game actions, and wherein generating the sequence of pre-recorded video segments comprises:

determining a first game action of the plurality of game actions based on the game sequence;

selecting a first pre-recorded video segment from a plurality of pre-recorded video segments corresponding to the first game action;

generating, in the user interface of the software application, a first display related to the first game action, the first display comprising at least a portion of the first pre-recorded video segment of the sequence of pre-recorded video segments, wherein the first pre-recorded video segment depicts the first game action being performed by the human dealer;

determining a second game action of the plurality of game actions based on the game sequence; and generating, in the user interface of the software application, a second display related to the second game action, the second display comprising (i) at least a portion of a second pre-recorded video segment of the sequence of pre-recorded video segments and (ii) two or more objects representing respective playing cards, the two or more objects at least partially overlaying the second pre-recorded video segment, wherein the second pre-recorded video segment depicts the second game action being performed by the human dealer.

* * * * *